United States Patent
Geppert et al.

(10) Patent No.: US 10,574,623 B2
(45) Date of Patent: Feb. 25, 2020

(54) SYSTEM AND METHOD FOR GRAPHICALLY MANAGING A COMMUNICATION SESSION WITH A CONTEXT BASED CONTACT SET

(75) Inventors: Birgit Geppert, Basking Ridge, NJ (US); Frank Roessler, Basking Ridge, NJ (US)

(73) Assignee: Avaya Inc., Basking Ridge, NJ (US)

(*) Notice: Subject to any disclaimer, the term of this patent is extended or adjusted under 35 U.S.C. 154(b) by 753 days.

(21) Appl. No.: 12/749,058

(22) Filed: Mar. 29, 2010

(65) Prior Publication Data

US 2010/0251177 A1  Sep. 30, 2010

Related U.S. Application Data

(60) Provisional application No. 61/164,753, filed on Mar. 30, 2009.

(51) Int. Cl.
*G06F 3/00* (2006.01)
*H04L 12/58* (2006.01)
(Continued)

(52) U.S. Cl.
CPC ............ *H04L 51/36* (2013.01); *G06F 3/0486* (2013.01); *G06F 3/04817* (2013.01);
(Continued)

(58) Field of Classification Search
CPC ... G06F 3/00; G06F 3/14; G06F 3/048; G06F 15/16; G06F 3/04842; G06F 3/0482;
(Continued)

(56) References Cited

U.S. PATENT DOCUMENTS 5,140,562 A   8/1992   Moore-Ede et al.
5,195,086 A   3/1993   Baumgartner et al.
(Continued)

FOREIGN PATENT DOCUMENTS

CN   1292127    4/2001
DE   19543870   5/1996
(Continued)

OTHER PUBLICATIONS

Honda et al., "e-MulCS; Multi-Party Conference System with Virtual Space and the Intuitive Input Interface", Proceedings of the 2004 International Symposium on Applications and the Internet (SAINT'04) pp. 56-63, 2004.
(Continued)

*Primary Examiner* — Di Xiao
(74) *Attorney, Agent, or Firm* — Sheridan Ross P.C.

(57) ABSTRACT

Disclosed herein are systems, methods, and non-transitory computer-readable storage media for presenting a contact manager associated with a communication session represented in a graphical user interface (GUI). The method includes grouping by context contacts associated with a user in the communication session, wherein the communication session is displayed as a set of connected graphical elements representing a structure of the communication session, presenting on the GUI a graphical representation of at least a part of the grouped contacts, receiving user input associated with one contact of the contacts and the communication session, and modifying the communication session based on information associated with the user input and the one contact. Grouping the contacts by context can include sorting the contacts as a cache, and grouping based on user preferences, user communications history, social networks, topic, project, and/or employer.

19 Claims, 13 Drawing Sheets

(51) Int. Cl.
*G06F 3/0481* (2013.01)
*G06F 3/0486* (2013.01)
*H04L 12/18* (2006.01)
*H04M 1/2745* (2020.01)
*H04M 3/56* (2006.01)
*H04L 29/06* (2006.01)
*H04W 4/21* (2018.01)
*H04M 1/247* (2006.01)
*G06F 3/0484* (2013.01)
*G06Q 10/10* (2012.01)
*H04M 3/42* (2006.01)

(52) U.S. Cl.
CPC ...... *G06F 3/04842* (2013.01); *H04L 12/1822* (2013.01); *H04L 51/046* (2013.01); *H04L 65/1069* (2013.01); *H04L 65/403* (2013.01); *H04M 1/247* (2013.01); *H04M 1/27455* (2013.01); *H04M 3/563* (2013.01); *H04W 4/21* (2018.02); *G06Q 10/10* (2013.01); *H04L 51/04* (2013.01); *H04M 1/274508* (2013.01); *H04M 3/42068* (2013.01); *H04M 3/42161* (2013.01); *H04M 3/42221* (2013.01); *H04M 3/42289* (2013.01); *H04M 3/564* (2013.01); *H04M 2201/42* (2013.01); *H04M 2203/5027* (2013.01); *H04M 2250/22* (2013.01); *H04M 2250/62* (2013.01)

(58) Field of Classification Search
CPC .. G06F 3/04817; G06F 17/289; G06F 19/328; G06F 19/3418; G06F 21/31; G06F 21/335; G06F 21/6245; G06F 3/0481; G06F 3/0484; G06F 3/0488; G06F 3/04883; G06F 3/04886; G06F 16/29; G06F 16/954; G06F 17/2818; G06F 17/2872; G06F 1/1694; G06F 21/6227; G06F 21/6254; G06F 2203/04803; G06F 3/017; G06F 3/04845; G06F 3/04847; G06F 3/0486; G06F 3/147; G06F 3/165; H04L 51/36
USPC .......................... 715/762, 821, 863; 709/206
See application file for complete search history.

(56) References Cited

U.S. PATENT DOCUMENTS

| | | | |
|---|---|---|---|
| 5,500,934 A | 3/1996 | Austin et al. | |
| 5,533,110 A * | 7/1996 | Pinard et al. | 379/355.01 |
| 5,627,978 A * | 5/1997 | Altom | G06F 3/0481 715/758 |
| 5,745,711 A | 4/1998 | Kitahara et al. | |
| 5,758,079 A | 5/1998 | Ludwig et al. | |
| 5,768,552 A | 6/1998 | Jacoby | |
| 5,892,764 A | 4/1999 | Riemann et al. | |
| 5,896,128 A | 4/1999 | Boyer | |
| 5,940,488 A | 8/1999 | DeGrazia et al. | |
| 5,949,414 A | 9/1999 | Namikata et al. | |
| 5,999,208 A | 12/1999 | McNerney | |
| 5,999,609 A | 12/1999 | Nishimura | |
| 6,011,553 A | 1/2000 | Komiyama | |
| 6,067,357 A | 5/2000 | Kishinsky et al. | |
| 6,191,807 B1 | 2/2001 | Hamada et al. | |
| 6,208,658 B1 | 3/2001 | Pickett | |
| 6,278,454 B1 | 8/2001 | Krishnan | |
| 6,286,034 B1 | 9/2001 | Sato et al. | |
| 6,415,020 B1 | 7/2002 | Pinard et al. | |
| 6,445,682 B1 | 9/2002 | Weitz | |
| 6,496,201 B1 | 12/2002 | Baldwin et al. | |
| 6,501,740 B1 | 12/2002 | Sun et al. | |
| 6,559,863 B1 | 5/2003 | Megiddo | |
| 6,608,636 B1 | 8/2003 | Roseman | |
| 6,751,669 B1 | 6/2004 | Ahuja et al. | |
| 6,853,398 B2 | 2/2005 | Malzbender et al. | |
| D528,553 S | 9/2006 | Nevill-Manning et al. | |
| D529,036 S | 9/2006 | Koch et al. | |
| D529,037 S | 9/2006 | Koch et al. | |
| D529,920 S | 10/2006 | Nevill-Manning et al. | |
| 7,124,164 B1 | 10/2006 | Chemtob | |
| 7,127,685 B2 | 10/2006 | Canfield et al. | |
| 7,136,466 B1 | 11/2006 | Gao | |
| 7,162,699 B1 | 1/2007 | Pena-Mora et al. | |
| 7,167,182 B2 | 1/2007 | Butler | |
| 7,213,206 B2 | 5/2007 | Fogg | |
| 7,269,162 B1 | 9/2007 | Turner | |
| 7,478,129 B1 | 1/2009 | Chemtob | |
| D591,304 S | 4/2009 | Banks et al. | |
| 7,519,912 B2 | 4/2009 | Moody et al. | |
| 7,571,254 B1 | 8/2009 | Canova, Jr. et al. | |
| D603,866 S | 11/2009 | Banks et al. | |
| 7,644,144 B1 | 1/2010 | Horvitz et al. | |
| 7,653,013 B1 | 1/2010 | Moran | |
| 7,734,692 B1 | 6/2010 | Kaplan et al. | |
| 7,780,533 B2 | 8/2010 | Yamauchi et al. | |
| 7,831,917 B1 | 11/2010 | Karam | |
| 7,949,952 B2 | 5/2011 | Hawley et al. | |
| 8,062,302 B2 | 12/2011 | Bercker et al. | |
| 8,082,302 B2 | 12/2011 | Becker et al. | |
| 8,144,633 B2 | 3/2012 | Yoakum et al. | |
| 8,223,186 B2 | 7/2012 | Derocher et al. | |
| 8,243,902 B2 | 8/2012 | Caspi et al. | |
| 8,375,034 B2 | 2/2013 | Norton et al. | |
| 8,607,250 B2 | 12/2013 | Oral et al. | |
| 8,775,595 B2 * | 7/2014 | Leacock | H04L 51/043 709/203 |
| 8,786,664 B2 | 7/2014 | Hornyak et al. | |
| 9,225,537 B1 * | 12/2015 | Hendricks | H04L 12/1813 |
| 9,363,147 B2 | 6/2016 | Quillen et al. | |
| 2003/0001890 A1 | 1/2003 | Brin | |
| 2003/0002633 A1 | 1/2003 | Kredo et al. | |
| 2003/0055974 A1 | 3/2003 | Brophy | |
| 2003/0063072 A1 | 4/2003 | Brandenberg et al. | |
| 2003/0063728 A1 | 4/2003 | Sibal et al. | |
| 2003/0133562 A1 | 7/2003 | Ooki | |
| 2003/0206619 A1 | 11/2003 | Curbow et al. | |
| 2003/0236835 A1 | 12/2003 | Levi et al. | |
| 2004/0019683 A1 | 1/2004 | Lee et al. | |
| 2004/0028199 A1 | 2/2004 | Carlson | |
| 2004/0125937 A1 | 7/2004 | Turcan et al. | |
| 2004/0218751 A1 | 11/2004 | Colson et al. | |
| 2004/0235520 A1 | 11/2004 | Cadiz et al. | |
| 2004/0258222 A1 | 12/2004 | Kobrosly et al. | |
| 2004/0264652 A1 | 12/2004 | Erhart et al. | |
| 2005/0021624 A1 | 1/2005 | Herf et al. | |
| 2005/0132012 A1 | 6/2005 | Muller et al. | |
| 2005/0141694 A1 | 6/2005 | Wengrovitz | |
| 2005/0151836 A1 | 7/2005 | Ni | |
| 2005/0171412 A1 | 8/2005 | George | |
| 2005/0181878 A1 * | 8/2005 | Danieli | A63F 13/12 463/42 |
| 2005/0182745 A1 | 8/2005 | Dhillon et al. | |
| 2005/0187808 A1 | 8/2005 | Adamson et al. | |
| 2005/0251555 A1 | 11/2005 | Little, II | |
| 2006/0019655 A1 | 1/2006 | Peacock | |
| 2006/0023859 A1 | 2/2006 | Crockett et al. | |
| 2006/0031332 A1 | 2/2006 | Brownholtz et al. | |
| 2006/0053380 A1 | 3/2006 | Spataro et al. | |
| 2006/0059236 A1 | 3/2006 | Sheppard et al. | |
| 2006/0078883 A1 | 4/2006 | Ueda et al. | |
| 2006/0098793 A1 | 5/2006 | Erhart et al. | |
| 2006/0107303 A1 | 5/2006 | Erhart et al. | |
| 2006/0117264 A1 | 6/2006 | Beaton et al. | |
| 2006/0123082 A1 | 6/2006 | Digate et al. | |
| 2006/0135142 A1 | 6/2006 | Repka | |
| 2006/0147009 A1 | 7/2006 | Greenlee et al. | |
| 2006/0190546 A1 | 8/2006 | Daniell | |
| 2006/0235716 A1 | 10/2006 | Mahesh et al. | |
| 2006/0236269 A1 | 10/2006 | Borna | |
| 2007/0053308 A1 | 3/2007 | DuMas et al. | |
| 2007/0088818 A1 | 4/2007 | Roberts et al. | |
| 2007/0105548 A1 | 5/2007 | Mohan et al. | |

(56) References Cited

U.S. PATENT DOCUMENTS

| | | |
|---|---|---|
| 2007/0121893 A1 | 5/2007 | Khouri et al. |
| 2007/0174787 A1* | 7/2007 | Rhee ............... G06F 17/30126 715/810 |
| 2007/0186193 A1 | 8/2007 | Curran |
| 2007/0201674 A1 | 8/2007 | Annadata et al. |
| 2007/0206768 A1 | 9/2007 | Bourne et al. |
| 2007/0208806 A1 | 9/2007 | Mordecai et al. |
| 2007/0219659 A1 | 9/2007 | Abhyanker et al. |
| 2007/0260685 A1 | 11/2007 | Surazski |
| 2007/0279484 A1 | 12/2007 | Derocher et al. |
| 2007/0282621 A1* | 12/2007 | Altman et al. ................. 705/1 |
| 2007/0288562 A1 | 12/2007 | Shaffer et al. |
| 2007/0288627 A1 | 12/2007 | Abella et al. |
| 2008/0005235 A1 | 1/2008 | Hedge et al. |
| 2008/0030496 A1 | 2/2008 | Lee et al. |
| 2008/0043963 A1 | 2/2008 | Kondapalli et al. |
| 2008/0049921 A1 | 2/2008 | Davis et al. |
| 2008/0075247 A1 | 3/2008 | Tanaka et al. |
| 2008/0080386 A1 | 4/2008 | Calahan et al. |
| 2008/0088698 A1 | 4/2008 | Patel et al. |
| 2008/0097816 A1 | 4/2008 | Freire et al. |
| 2008/0115087 A1* | 5/2008 | Rollin ............... G06Q 10/107 715/811 |
| 2008/0120371 A1 | 5/2008 | Gopal |
| 2008/0133580 A1* | 6/2008 | Wanless ............ H04L 29/12122 |
| 2008/0148156 A1 | 6/2008 | Brewer et al. |
| 2008/0167056 A1 | 7/2008 | Gilzean et al. |
| 2008/0215583 A1* | 9/2008 | Gunawardena ..... G06F 16/9535 |
| 2008/0263475 A1 | 10/2008 | Hwang |
| 2008/0266378 A1 | 10/2008 | Ryu |
| 2008/0309617 A1* | 12/2008 | Kong et al. ................ 345/157 |
| 2009/0006980 A1 | 1/2009 | Hawley et al. |
| 2009/0019367 A1 | 1/2009 | Cavagnari et al. |
| 2009/0024952 A1 | 1/2009 | Brush et al. |
| 2009/0054107 A1 | 2/2009 | Feland, III et al. |
| 2009/0059818 A1 | 3/2009 | Pickett |
| 2009/0061832 A1 | 3/2009 | Goggans et al. |
| 2009/0086012 A1 | 4/2009 | Thapa |
| 2009/0089683 A1 | 4/2009 | Thapa |
| 2009/0094559 A1* | 4/2009 | Shoshan ............... G06Q 10/10 715/853 |
| 2009/0125819 A1 | 5/2009 | Hamilton, II et al. |
| 2009/0138554 A1 | 5/2009 | Longobardi et al. |
| 2009/0204904 A1 | 8/2009 | Mujkic et al. |
| 2009/0228322 A1 | 9/2009 | van Os et al. |
| 2009/0241031 A1 | 9/2009 | Gamaley et al. |
| 2009/0248709 A1 | 10/2009 | Fuhrmann et al. |
| 2009/0248852 A1 | 10/2009 | Fuhrmann et al. |
| 2009/0249226 A1 | 10/2009 | Manolescu et al. |
| 2009/0290696 A1 | 11/2009 | K. N. |
| 2009/0307620 A1 | 12/2009 | Hamilton, II et al. |
| 2009/0319623 A1 | 12/2009 | Srinivasan et al. |
| 2010/0011304 A1* | 1/2010 | van Os ................ 715/762 |
| 2010/0023585 A1 | 1/2010 | Nersu et al. |
| 2010/0076807 A1 | 3/2010 | Bells et al. |
| 2010/0083137 A1 | 4/2010 | Shin et al. |
| 2010/0083140 A1 | 4/2010 | Dawson et al. |
| 2010/0085417 A1 | 4/2010 | Satyanarayanan et al. |
| 2010/0093330 A1 | 4/2010 | Bluvband et al. |
| 2010/0098230 A1 | 4/2010 | Bhow |
| 2010/0105437 A1 | 4/2010 | Lee et al. |
| 2010/0162153 A1* | 6/2010 | Lau ................ G06F 3/0488 715/769 |
| 2010/0167710 A1 | 7/2010 | Alhainen |
| 2010/0169363 A1* | 7/2010 | Gaedcke ............ G06F 16/9535 707/769 |
| 2010/0180212 A1 | 7/2010 | Gingras et al. |
| 2010/0182921 A1 | 7/2010 | Basart et al. |
| 2010/0203875 A1 | 8/2010 | Nishimori |
| 2010/0220635 A1* | 9/2010 | Gisby ............... H04L 12/1822 370/261 |
| 2010/0222028 A1 | 9/2010 | Gisby et al. |
| 2010/0223089 A1 | 9/2010 | Godfrey et al. |
| 2010/0234052 A1 | 9/2010 | Lapstun et al. |
| 2010/0246571 A1 | 9/2010 | Geppert et al. |
| 2010/0246791 A1 | 9/2010 | Wang et al. |
| 2010/0251119 A1 | 9/2010 | Geppert et al. |
| 2010/0251127 A1 | 9/2010 | Geppert et al. |
| 2010/0251158 A1 | 9/2010 | Geppert et al. |
| 2010/0273447 A1 | 10/2010 | Mann et al. |
| 2010/0312836 A1 | 12/2010 | Serr et al. |
| 2011/0022968 A1 | 1/2011 | Conner et al. |
| 2011/0109940 A1 | 5/2011 | Silverbrook et al. |
| 2011/0151905 A1 | 6/2011 | Lapstun et al. |
| 2011/0182415 A1 | 7/2011 | Jacobstein et al. |
| 2011/0191136 A1 | 8/2011 | Bourne et al. |
| 2011/0196868 A1* | 8/2011 | Hans ............... H04M 1/274583 707/737 |
| 2011/0222675 A1 | 9/2011 | Chua et al. |
| 2011/0271206 A1 | 11/2011 | Jones et al. |
| 2011/0296312 A1 | 12/2011 | Boyer et al. |
| 2011/0302509 A1 | 12/2011 | Leacock et al. |
| 2012/0019610 A1 | 1/2012 | Hornyak et al. |
| 2012/0077536 A1* | 3/2012 | Goel et al. ................ 455/518 |
| 2012/0079099 A1* | 3/2012 | Dhara ................. G06Q 10/107 709/224 |
| 2012/0083252 A1 | 4/2012 | Lapstun et al. |
| 2012/0084672 A1 | 4/2012 | Vonog et al. |
| 2012/0110473 A1 | 5/2012 | Tseng |
| 2012/0216129 A1 | 8/2012 | Ng et al. |
| 2012/0259633 A1 | 10/2012 | Aihara et al. |
| 2013/0080954 A1 | 3/2013 | Carlhian et al. |
| 2013/0108035 A1 | 5/2013 | Lyman |
| 2013/0250038 A1 | 9/2013 | Satyanarayanan et al. |
| 2013/0268866 A1 | 10/2013 | Lyman |
| 2014/0108023 A1 | 4/2014 | Arkoff |
| 2014/0333713 A1 | 11/2014 | Shoemake et al. |

FOREIGN PATENT DOCUMENTS

| | | |
|---|---|---|
| DE | 19716316 | 10/1998 |
| EP | 0453128 | 10/1991 |
| EP | 0717544 | 6/1996 |
| EP | 1480422 | 11/2004 |
| EP | 1983729 | 10/2008 |
| GB | 2338146 | 12/1999 |
| JP | H7-74834 | 3/1995 |
| JP | H08-251261 | 9/1996 |
| JP | 2004-199644 | 2/1997 |
| JP | 2002-297873 | 10/2002 |
| JP | 2003-296556 | 10/2003 |
| JP | 2004-102389 | 4/2004 |
| JP | H09-055983 | 7/2004 |
| JP | 2004-320235 | 11/2004 |
| JP | 2005-318055 | 11/2005 |
| JP | 2006-050370 | 2/2006 |
| JP | 2006-060340 | 3/2006 |
| JP | 2006-092367 | 4/2006 |
| JP | 2007-004000 | 1/2007 |
| JP | 2007-13694 | 1/2007 |
| JP | 2007-143144 | 6/2007 |
| JP | 2008-171068 | 7/2008 |
| JP | 2009-20829 | 1/2009 |
| JP | 2009-502048 | 1/2009 |
| JP | 2009-044679 | 2/2009 |
| KR | 2006-0058872 | 6/2006 |
| KR | 2006-0132484 | 12/2006 |
| KR | 2006-0001500 | 1/2009 |
| WO | WO 9821871 | 5/1998 |
| WO | WO 9945716 | 9/1999 |
| WO | WO 0018082 | 3/2000 |
| WO | WO 2006/054153 | 5/2006 |
| WO | WO 2006/060340 | 6/2006 |
| WO | WO 2007/008321 | 1/2007 |

OTHER PUBLICATIONS

Byrne et al., "Developing multiparty conferencing services for the NGN: towards a service creation framework", Jun. 2004, ISICT '04: Proceedings of the 2004 International Symposium on Information and Communication.

(56) References Cited

OTHER PUBLICATIONS

WebEx, WebEx Meeting Center User's Guide, 2007, WebEx Communications Inc., Version 8, pp. 1-332.
English Translation of Official Action for China Patent Application No. 201010195951.0, dated Nov. 30, 2015 10 pages.
Official Action with English Translation for China Patent Application No. 201310239355.1, dated Jan. 15, 2016 7 pages.
Official Action with English Translation for Korea Patent Application No. 2012-0062908, dated Dec. 30, 2015 7 pages.
Official Action for U.S. Appl. No. 12/749,028, dated Jun. 7, 2012 13 pages.
Official Action for U.S. Appl. No. 12/749,028, dated Nov. 21, 2012 11 pages.
Official Action for U.S. Appl. No. 12/749,028, dated May 2, 2014 14 pages.
Official Action for U.S. Appl. No. 12/749,028, dated Nov. 20, 2014 17 pages.
Official Action for U.S. Appl. No. 12/749,028, dated Aug. 4, 2015 18 pages.
Official Action for U.S. Appl. No. 12/749,028, dated Jan. 11, 2016 22 pages.
Official Action for U.S. Appl. No. 12/749,094, dated Jun. 21, 2012 12 pages.
Official Action for U.S. Appl. No. 12/749,094, dated Nov. 6, 2012 11 pages.
Official Action for U.S. Appl. No. 12/749,094, dated Oct. 21, 2014 15 pages.
Official Action for U.S. Appl. No. 12/749,094, dated Apr. 22, 2015 13 pages.
Official Action for U.S. Appl. No. 12/749,094, dated Dec. 17, 2015 13 pages.
Official Action for U.S. Appl. No. 12/749,123, dated Feb. 29, 2012 11 pages.
Official Action for U.S. Appl. No. 12/749,123, dated Jul. 23, 2012 9 pages.
Official Action for U.S. Appl. No. 12/749,123, dated May 2, 2014 13 pages.
Official Action for U.S. Appl. No. 12/749,123, dated Sep. 10, 2015 9 pages.
Official Action for U.S. Appl. No. 12/749,123, dated Dec. 21, 2015 10 pages.
Official Action for U.S. Appl. No. 12/749,150, dated Jun. 13, 2012 11 pages.
Official Action for U.S. Appl. No. 12/749,150, dated Oct. 24, 2012 10 pages.
Official Action for U.S. Appl. No. 12/749,150, dated Aug. 13, 2014 11 pages.
Official Action for U.S. Appl. No. 12/749,150, dated Nov. 21, 2014 10 pages.
Official Action for U.S. Appl. No. 12/749,150, dated Dec. 15, 2015 10 pages.
Decision to Refuse for European Patent Application No. 10158401.9, dated Jun. 2, 2017 10 pages.
Decision to Refuse for European Patent Application No. 10158453.0, dated Jun. 16, 2017 13 pages.
Summons to Attend Oral Proceedings for European Patent Application No. 10158453.0, dated Jun. 23, 2016 6 pages.
Intention to Grant for European Patent Application No. 10158406.8, dated May 24, 2017 53 pages.
Intention to Grant for European Patent Application No. 10158403.5, dated May 29, 2017 60 pages.
Summons to Attend Oral Proceedings for European Patent Application No. 10158399.5, dated Jun. 9, 2016 5 pages.
Official Action for U.S. Appl. No. 12/749,028, dated Jul. 6, 2016 24 pages.
Official Action for U.S. Appl. No. 12/749,028, dated Dec. 16, 2016 28 pages.
Official Action for U.S. Appl. No. 12/749,028, dated Apr. 6, 2017 24 pages.
Official Action for U.S. Appl. No. 12/749,028, dated Nov. 2, 2017 21 pages.
Official Action for U.S. Appl. No. 12/749,094, dated Jun. 7, 2016 12 pages.
Official Action for U.S. Appl. No. 12/749,094, dated Jul. 25, 2016 15 pages.
Official Action for U.S. Appl. No. 12/749,094, dated Nov. 23, 2016 15 pages.
Official Action for U.S. Appl. No. 12/749,094, dated Feb. 6, 2017 15 pages.
Official Action for U.S. Appl. No. 12/749,094, dated Jun. 14, 2017 15 pages.
Notice of Allowance for U.S. Appl. No. 12/749,094, dated Oct. 5, 2017 8 pages.
Official Action for U.S. Appl. No. 12/749,123, dated Oct. 3, 2016 17 pages.
Official Action for U.S. Appl. No. 12/749,123, dated Dec. 6, 2016 17 pages.
Official Action for U.S. Appl. No. 12/749,123, dated May 10, 2017 16 pages.
Official Action for U.S. Appl. No. 12/749,123, dated Sep. 12, 2017 26 pages.
Official Action for U.S. Appl. No. 12/749,150, dated May 17, 2016 17 pages.
Official Action for India Patent Application No. 962/MUM/2010, dated Sep. 18, 2018 6 pages.
Official Action for India Patent Application No. 967/MUM/2010, dated Sep. 25, 2018 6 pages.
Official Action for India Patent Application No. 969/MUM/2010, dated Jul. 24, 2018 6 pages.
Official Action for India Patent Application No. 970/MUM/2010, dated Aug. 29, 2018 7 pages.
Official Action for U.S. Appl. No. 12/749,123, dated Oct. 11, 2018 29 pages.
Examiner's Answer to Appeal Brief for U.S. Appl. No. 12/749,123, dated Jan. 30, 2019 36 pages.

* cited by examiner

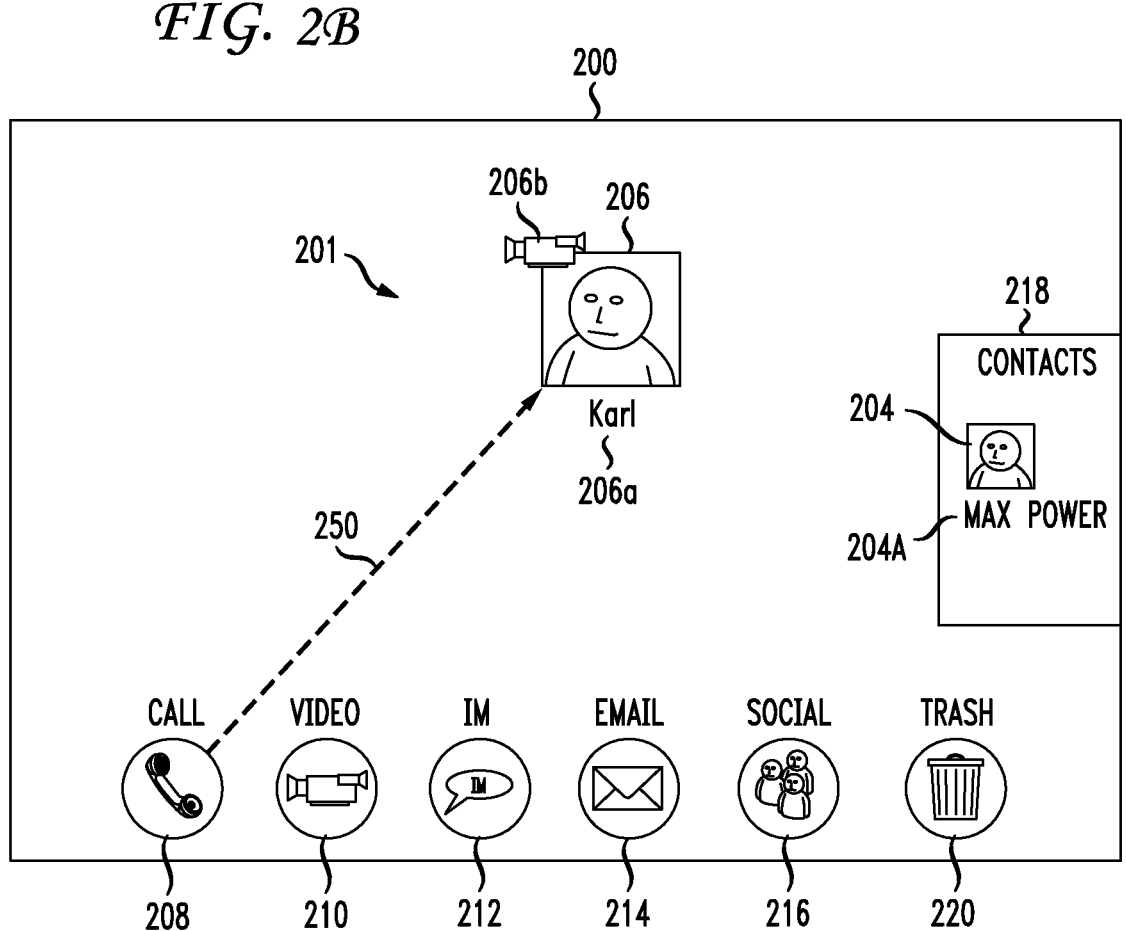

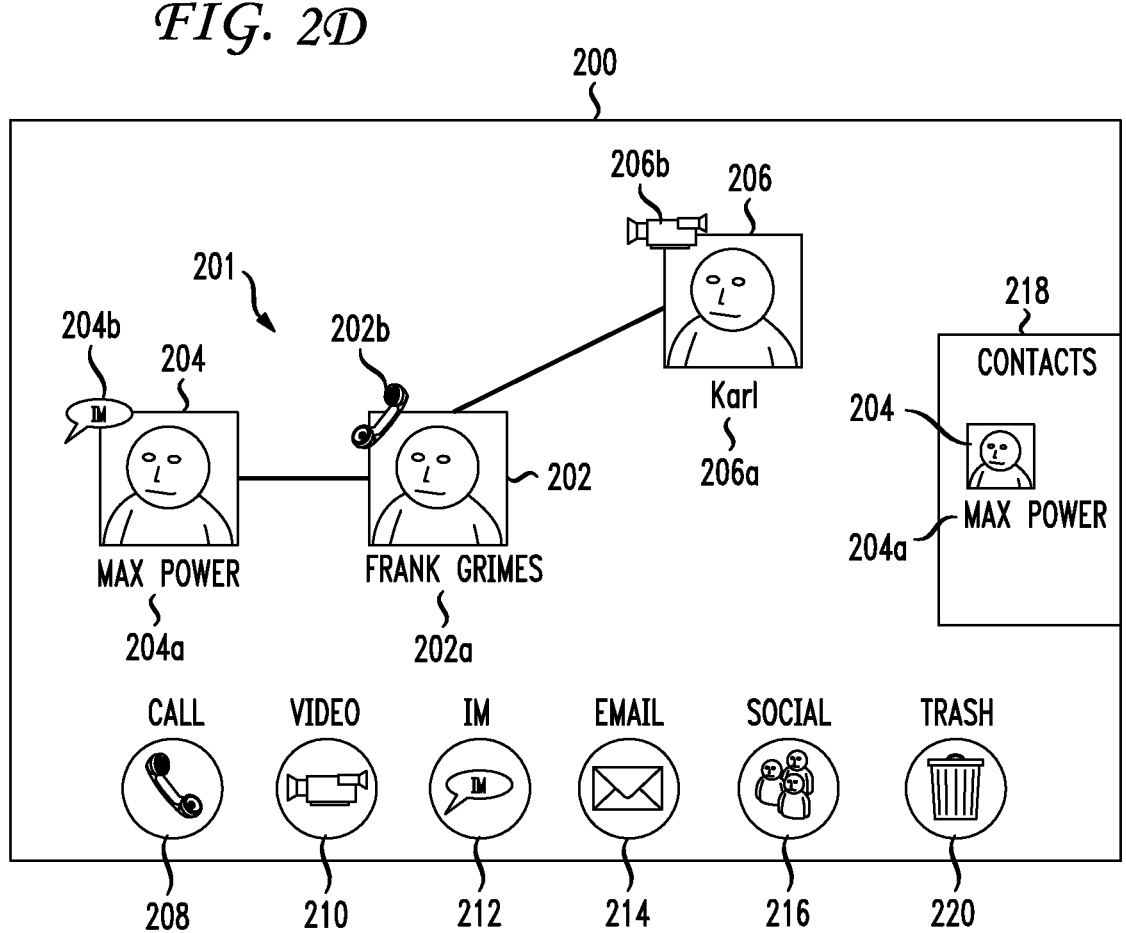

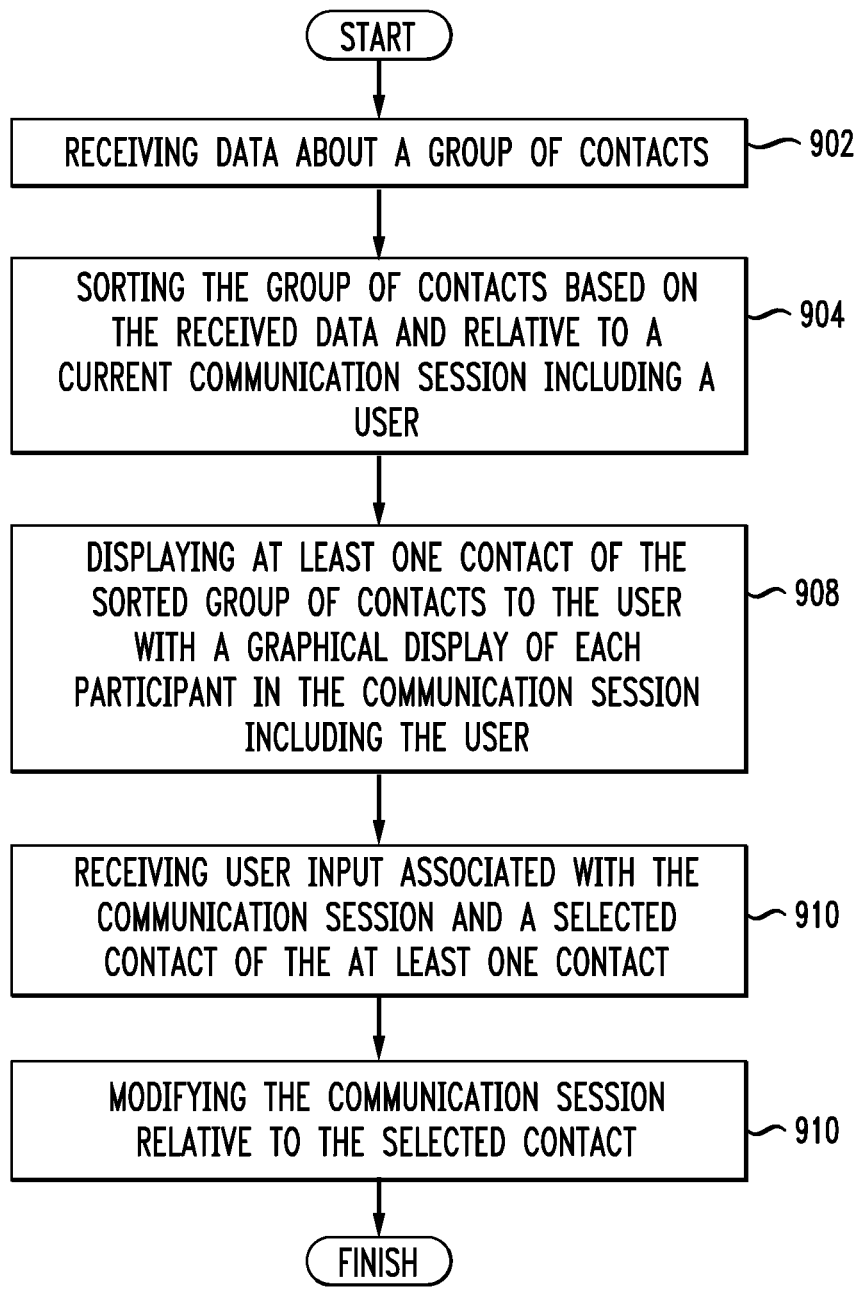

SYSTEM AND METHOD FOR GRAPHICALLY MANAGING A COMMUNICATION SESSION WITH A CONTEXT BASED CONTACT SET

RELATED APPLICATIONS

This application claims priority to U.S. Provisional Application No. 61/164,753, filed 30 Mar. 2009, which is incorporated herein by reference in its entirety.

This application is related to (application Ser. No. 12/749,028), (application Ser. No. 12/749,094), (application Ser. No. 12/749,123), (application Ser. No. 12/749,150), (application Ser. No. 12/749,178), (application Ser. No. 12/749,103), and (application Ser. No. 12/749,122), all filed on Mar. 29, 2010, and each of which is herein incorporated herein by reference.

BACKGROUND

1. Technical Field

The present disclosure relates to telecommunications and more specifically to including presenting graphically a context-based set of contacts for use in managing a communication sessions via a graphical user interface (GUI). Communication sessions can exist in a variety of modes such as telephone calls, multi-media communication sessions, instant messaging sessions, email sessions, video conference sessions and the like.

2. Introduction

Touchtone telephones have been supplemented over the years by the addition of feature buttons and menus. Interfaces for these features have evolved from simple buttons to hierarchical menus actuated by trackballs, quadrant style pointers, and the like. As the number of features increases, the interfaces add more buttons, sequences, and/or combination of button presses. This proliferation of features has led to a multitude of different interfaces with varying levels of complexity. Often users resort to rote memorization of key features, but that is not always practical or desirable. Recently, telephones with touch-sensitive displays have begun to provide similar functionality. However, the touch-sensitive displays in such devices typically reproduce the feature buttons and menus, albeit on a touch-sensitive display.

Further, users are migrating to other communication forms, such as text messaging, instant messaging, email, chat sessions, video conferencing, and so forth. Incorporating the ability to handle these modes of communication into a traditional telephone increases the complexity and difficulty manyfold. What is needed in the art is a more intuitive communication management interface.

SUMMARY

The approaches set forth herein allow for improved communication session management with a focus on how to include a context-based set of contacts for use in managing the communication session or sessions. These approaches provide a graphical interface which enables a user to setup a communication session with various users and tear down or remove users from a communication session. The context-based set of contacts can be displayed to the user, and used by the user to manage the communication session. Context can include, but is not limited to, groupings by employment, organization, family relationships, friends, projects, hobbies and other interests and can also show graphically degrees of separation and/or trust, e.g., for example a friend of a friend is one step further separated and as such is not as trusted.

A system, method and non-transitory computer readable media are disclosed which displays, on a graphical user interface, a set of graphical connected elements representing a structure of a communication session, or group of communication sessions, for a user. A set of contacts can be grouped based on context. An example context can include a group of individuals previously contacted in the last week that are associated in some way with the other members of a current communication session. By presenting a context-based set of contacts on the graphical interface, the system can receive user input associated with one of the contacts and the communication session and take an action associated with that input. The action can include adding that person to the communication session, sending an instant messaging ("IM") message to that contact, and so forth. The set of contacts can be managed by a contact manager which combines software programming with one or more hardware components to gather data about various possible contacts for a user and make determinations about how to sort and present a set of contacts as part of a communication session.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2B illustrates a view of an incoming communication session;

FIG. 2D illustrates a view of the communication session after adding a third party;

FIG. 9 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved communication session management with a specific focus on how to include a context-based set of contacts for use in managing the communication session or sessions. A companion case U.S. patent application Ser. No. 12/749,028, filed Mar. 29, 2010 discloses a graphical interface which enables a user to setup a communication session with various users and tear down or remove users from a communication session. This application utilizes that underlying concept and provides an additional feature of utilizing a displayed set of context-based contacts in managing the communication session. Context can include, but is not limited to, groupings by employment, organization, family relationships, friends, projects, hobbies and other interests and can also show graphically degrees of separation and/or trust, e.g., for example a friend of a friend is one step further separated and as such is not as trusted.

A system, method and non-transitory computer readable media are disclosed which displays on a graphical user interface a set of graphical connected elements representing a structure of a particular communication session or group of communication sessions for a user. A set of contacts are grouped based on context. An example context includes a group of individuals previously contacted in the last week that are associated in some way with the other members of a current communication session. By presenting a context-based set of contacts on the graphical interface, the system can receive user input associated with one of the contacts and the communication session and take an action associated with that input. The action can include adding that person to the communication session, sending an IM message to that contact, and so forth. The set of contacts can be managed by a contact manager which combines software programming with one or more hardware components to gather data about various possible contacts for a user and make determinations about how to sort and present a set of contacts as part of a communication session.

Figure 1:
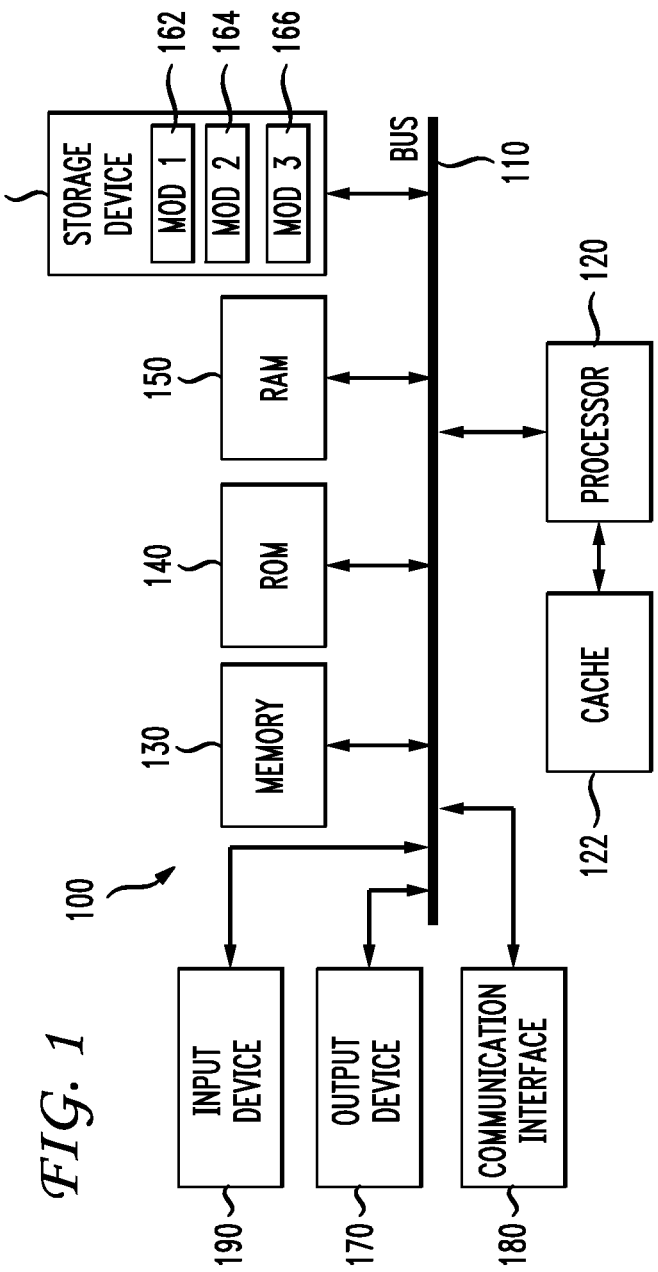
FIG. 1 illustrates an example system embodiment.

A brief introductory description with reference to FIGS. 2A-2D will be provided, followed by a discussion of a basic general purpose system in FIG. 1 which can be employed to practice the concepts disclosed herein and more detailed descriptions of methods and graphical interfaces.

Presenting the graphical interface of FIGS. 2A-2D which illustrates the communication session enables the system to receive via the interface user input, which can include multimodal user input, to manage the communication session. For example, a user on a communication session can drag and drop or otherwise move and locate from the context-based contacts list another person to add to the communication session. The system receives that input and automatically dials the phone number for that contact and adds them to the communication session. Users can be dropped from the call by dragging a connected element representing the user to a trash bin or other icon representing removing them from the communication session.

The communication session is also agnostic with respect to the mode of communication. The same metaphor of a connected user in a communication session being displayed on the graphical interface can represent a called/calling user, an instant messaging (IM) user, an email user, a user connecting via video conferencing, web conferencing, and so forth. For example, from the context shown in FIG. 2A, the user can select a contact and then use the same type of user input (drag and drop, flicking, gestures, etc.) to initiate any of the communication modes with that person. The user does not have to know or learn different input mechanisms for different communication modes.

The presentation of the graphical elements in connection with participants in a session, how they are connected and how the user interacts with the elements all vary depending on the needs and current active context of the communication session. For example, elements associated with participants in a session can include text, titles, positions, or any other data about each user. The connection metaphor between users can also represent information such as the type of connection (phone, video, web conference, etc), the quality of the connection (low-band, high-band, etc.), a hierarchy of how participants are related to the primary user (friend, associate, acquaintance, un-trusted user, etc.), a status of the connection (active, inactive, on-hold, etc.), and so forth. These variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, and the like, may also be used in the exemplary operating environment. Computer-readable storage media and devices expressly exclude transitory media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. If the device includes a graphical display which also receives touch sensitive input, the input device 190 and the output device 170 can be essentially the same element or display. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having briefly discussed the exemplary system embodiment, the disclosure now turns to FIGS. 2A, 2B, 2C, and 2D and other graphical views of an interface for managing communication sessions. A system 100, such as the one described in FIG. 1, can be configured to display a graphical user interface 200, such as the one described in FIGS. 2A-2D, and receive input for manipulating and managing the communication session. In one aspect, the system 100 interacts with a communications device, such as a telephone, instant messenger, personal or mobile computer, or email device to manage the communication session. For example, a user may have a desktop telephone that is in communication with a computing device which can interface with the telephone and present a display such as that shown in FIGS. 2A-2D to manage communication sessions using the telephone.

Figure 2A:
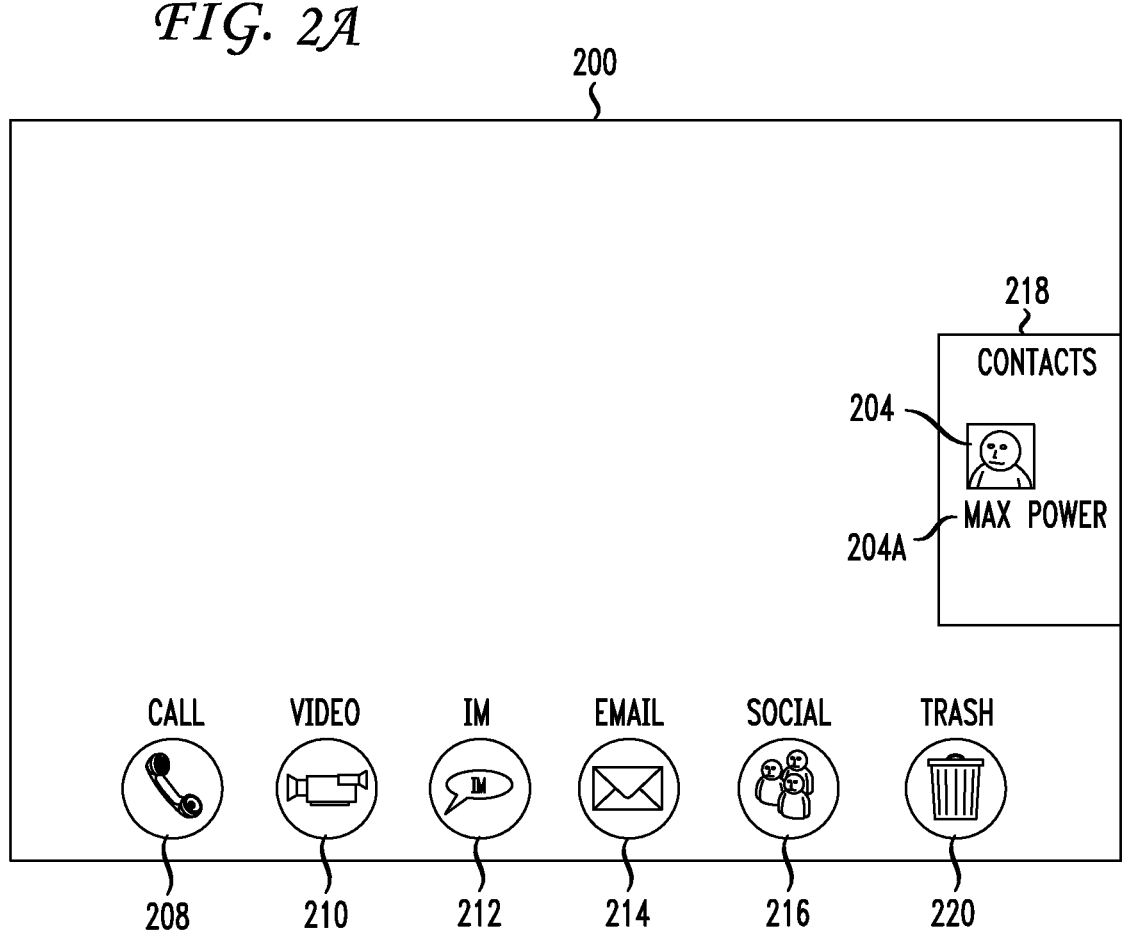
FIG. 2A illustrates an initial view not having any communication sessions.

FIG. 2A illustrates a display 200 of an initial graphical view without any communication sessions. The display 200 can include a series of icons 208, 210, 212, 214, 216, 220, and a contacts list 218 for initiating a communication session or interacting with an incoming communication session, for example. The series of FIGS. 2A-2D shall illustrate communication session management features such as setup and teardown of communication sessions, adding and removing participants from sessions, and so forth from the initial state shown in FIG. 2A.

As shall be discussed, from the context of FIG. 2A, the user can identify a person to contact, and then initiate any type of communication using the same mode to initiate any other type of communication. The system is agnostic in this respect. A drag and drop, gesture, tapping or any input mode described herein can be used to initiate and establish a phone call, teleconference with a group of individuals, an IM or email session, and so forth. Various examples of different inputs will be described in connection with the utility icons 208, 210, 212, 214, 216, 220 but any input mode can be applied to engage any utility.

FIG. 2B illustrates a view of an incoming communication session 201. The incoming communication session 201 can be any type of session such as an incoming phone call, incoming instant message, incoming text message, incoming request for a web conference or, in this case, an incoming video conference. The incoming communication session 201 shows an icon 206 representing the requester, Karl. The icon 206 can include sub-parts such as a name/title 206$a$ and a communication modality icon 206$b$, among others. The user can interact with the incoming communication session 201, for example, by clicking and dragging a modality icon onto the incoming communication session 201 to accept the incoming video conference request from Karl 206. In this example, the user clicks and drags 250 the icon for the telephone modality 208. The user can select a different icon.

The user can also provide other types of input to interact with communication sessions, such as tapping an icon via a touch screen or stylus, a flicking gesture, mouse clicks/movements, speech input, keyboard input, swipes or taps on a touch-sensitive surface, touchless gestures, and/or any other combination of suitable user input. In the case of touch, for example, taps of different duration or pressure can perform different actions. User input can include mouse movement, clicks, right clicks, double clicks, dragging, flicking, hovering, gestures, and so forth. The device can be shaken or tilted to receive accelerometer input, or positional/orientation input that indicates certain actions. Actions generally relate to connecting a utility icon with one ore more entities to perform functions such as ignore, send a message, accept an incoming call, create a communication session, remove a person from a session, and so forth.

Although FIG. 2B illustrates an incoming communication session 201, the user can initiate communication sessions in a number of other ways. For example, the user can drag a contact from a list of contacts 218 onto one of the communication modality icons 208, 210, 212, 214, 216. The user can also scroll through the list of contacts 218 to locate and select a contact 204 having an identifier 204a or group of desired contacts, then double-click or tap on the selected group to initiate a communication session. The identifier 204a can also include a graphic or icon showing available modes of communication for that contact (IM only), presence information (in their office but on a call) or scheduling information (such as the person is/is not available but has an opening in 1 hour). Information in a graphical form can also include local time, a time in the time zone of the host of the communication session, and/or biological time. Biological time can be an aspect of context. For example, a person who is acclimated to the Pacific time zone but who is currently located in the Eastern time zone may accept telephone call communication sessions at 10:00 p.m. local time even though others in the Eastern time zone may not. This information can help the user know whether to seek a communication with that contact. Such information can also be presented in connection with any icon or graphic representing an entity in a communication session. Other user interface variations can be used in addition to or in place of these examples.

Figure 2C:
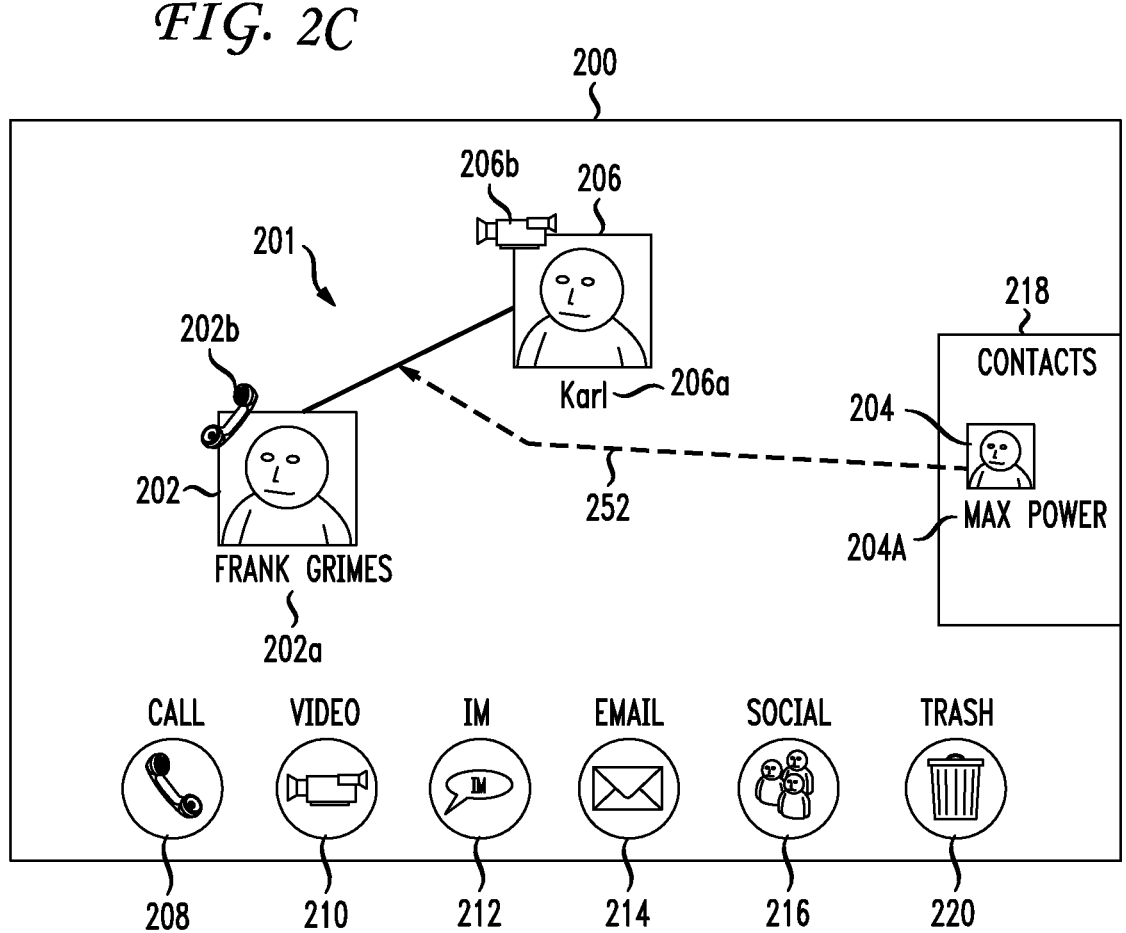
FIG. 2C illustrates an initial view after accepting the incoming communication session.

FIG. 2C illustrates a view after the user accepts the incoming communication session 201. In addition to the icon for Karl 206, the user's own icon 202 (the example user being Frank Grimes) appears in the communication session 201 as an icon 202 connected to Karl 206. Franks's icon 202 is optional and can include sub-parts such as a name/title 202a and a communication modality icon 202b. In this case, because the user responded to the incoming request with the telephone icon 208, Frank 202 communicates with Karl 206 in the communication session 201 via telephone, indicated by the smaller telephone icon 202b. Karl's icon 206 includes a video icon 206b which can represent video conferencing capability. Assume Frank 202 then wishes to add Max Power 204 from a list of contacts 218 to the communication session 201. The user 202 clicks and drags 252 Max Power's icon 204 directly from the list of contacts 218 and drops it on the communication session 201. The system 100 adds Max Power to the communication session as shown in FIG. 2D.

The system 100 can provide an interface to the user such that the user can use multiple different connection metaphors to establish or manipulate communication sessions. For example, the system 100 can display participant icons on the screen, show interconnections between participants and allow the user to place mode icons on each interconnection to establish the session. The system 100 can allow the user to position participant icons on the screen, select a mode and hit a button such as "go" or "connect". The system 100 can place participant icons on the screen, overlay communication mode icons on each participant icon and allow the user to hit "go" or "connect". These interface options are exemplary. The actual interface can be implemented in any of a number of variations.

In one aspect, participants join the communication session 201 via a telephone call. However, the communication session 201 is neutral with respect to various communication modalities and treats each the same even as users seek to join a call or other communication session.

In another aspect, the system 100 integrates the functions of one or more communications device. In this case, the display 200 shown in FIG. 2D may represent a computing device 100 (such as is generally shown in FIG. 1) that includes a microphone and speakers as well as a display. Such a device could act both as (1) a simple telephone to communicate via a telephone call the user's voice to another caller or a communication session and/or (2) a communication session management system for displaying an image representing the various parties or entities involved in the session and receive instructions to add or remove individuals and other wise manage the variety of parameters that are associated with a communication session 200.

The system 100 receives input via a physical or on-screen keyboard, mouse, stylus, touch screen, speech command, and/or single-touch or multi-touch gestures. Before a communication session is established, the system 100 can show a home screen where the graphical elements representing communications utilities such as 208, 210, 212, 214, 216 and 220 are shown. In one variation, the system 100 displays a summary or welcome page showing a short summary of news, messages, contacts, upcoming calendar events, and/or configuration options. In yet another variation, the system 100 displays a default input mechanism, such as a ten-key numeric pad for dialing telephone numbers.

The display 200 shows a communication session 201 of three connected graphical elements or entities 202, 204, 206. The set of graphical elements can include images, caricatures, avatars, text, and/or a hyperlink to additional information related to a user associated with the graphical elements. Any combination of graphical data can be presented to provide information about individual users, a connection mode, status, presence, other mode capabilities, and so forth. The text can include a name, a title, a position, a bio, a telephone number, email address, a current status, presence information, and location. The system can change or animate the graphical elements based on a contacted party context, persona, presence, and/or other factors. For example, an element may show an avatar or the person's face but show their eyes closed. This can mean that the person is not actively on the call or paying attention to the call. The avatar may show the person looking away or to the side or can show the person shaded or in some other graphical representation that they are not actively on the call, or that they have muted the call, on a sidebar and so forth. Active connections to the communication session can be visually represented as a graphical connection metaphor having overlapping graphical elements, a line connecting graphical elements, a shape connecting graphical elements, a shape with radiating lines connecting graphical elements, and/or a common augmented appearance of graphical elements. Overlapping or otherwise grouping graphical elements can represent individuals at one location. In such a case, information about the location can also be provided.

Further, changing color, thickness, animation, texture, and/or length of graphical elements can indicate a relationship or status of entities represented by the graphical elements.

The displayed communication session 201 in FIG. 2D represents a real-time communication of entities in a session. In this example, the real-time communication is a three-way communication session 201 between Frank Grimes 202, Max Power 204, and Karl 206, shown by connecting lines between their respective icons 202, 204, 206. It is assumed in FIGS. 2A-2D that Frank 202 is viewing this particular screen and is the host or manager of the communication session 201. Thus, the display 200 is the graphical display the system presents to him. Later figures will show the same communication session from the points of view of the other participants.

The call setup or communication session set up procedure shall be discussed next. In order to establish a communication session 201, the user can drag and drop a contact from a list of contacts 218 or from some other selection mechanism into the blank area or some designated spot such as over a the element 202 representing Frank Grimes. Each participant in the communication session 201 or contact in a list of contacts can have multiple associated addresses, phone numbers, or points of contact, such as a work phone, home phone, mobile phone, work email, home email, AIM address, social networking address such as a Facebook chat address, and the like. Each participant may also have an icon 202b, 204b, 206b or a qualifier that indicates not only the party but the contact mode. At this stage, a telephone number to be called or other communication address for alternate modes needs to be identified. The system can present an interface or menu which enables the user to enter via a keypad of any type a phone number to dial or to select a number for the user from a listing of numbers, or type in an email address for example if the user only can be reached by email. The system may only have one phone number for the selected contact and automatically dial that number. The system may also automatically select from available numbers based on any criteria such as previous history, presence information etc. FIG. 2D illustrates the stage in the process in which the user Frank Grimes 202 has selected both Max Power 204 and Karl 206 as shown and described in FIGS. 2A, 2B, and 2C.

The communication session 201 is not limited to a telephone call. The interface 200 enables the management of any communication session mode. When the user initiates a call, instant message, text message, videoconference, or the like with another user, the system 100 establishes a connection to the other party and displays a graphical representation of the communication session with the other party on the screen. The user can then add additional parties to the communication session in a similar manner. The user can remove participants from a communication session by dragging their element to a trash can icon 220, providing a flicking motion, clicking an X associated with that participant, highlight a participant and shaking the device, if it is mobile with accelerometer capability or click a physical or graphical disconnect button. In one aspect where the communication session is via telephone, the system 100 removes participants from the communication session when the user hangs up the telephone receiver. As participants leave the communication session, the system 100 removes their icon from the graphical representation of the communication session 201. As can be appreciated, adding and removing individual participants to and from the communication session occurs via the same drag and drop or other user input.

The graphical elements in FIGS. 2A-2D are icons, but can also include images, text, video, animations, sound, caricatures, and/or avatars. Users can personalize their own graphical elements or feed a live stream of images from a camera or video camera, for example. In addition, the graphical elements can have an associated string of text 202a, 204a, 206a. The string of text can include a name, a title, a position, a telephone number, email address, a current status, presence information, location, and/or any other available information. The string of text can be separate from but associated with the graphical element, as shown in FIGS. 2A-2D. Alternatively, the system 100 can overlay the string of text on top of the graphical element or integrate the text as part of the graphical element. All or part of the text and/or the graphical elements can be hyperlinks to additional information related to the user associated with the text or graphical elements, such as a blog or micro blog, email address, presence information, and so forth.

The system 100 can include for each icon 202, 204, 206 a respective graphical sub-element 202b, 204b, 206b that indicates the communication mode for each participant. For example, Max Power 204 is participating via an instant messaging (IM) client 204b; Frank Grimes 202 is participating via telephone 202b; Karl 206 is participating via a video conference client 206b. The system 100 is mode-neutral, meaning that the system 100 treats each mode of communication the same, such as telephone, cellular phone, voice over IP (VoIP), instant messaging, e-mail, text messaging, and video conferencing. As a user changes from one mode to another, the sub-elements can change accordingly. For example, if Frank Grimes 202 changes from a landline to a cellular phone mid-conference, the telephone icon 202b can change to a mobile phone icon.

Inasmuch as the system enables users to communicate in a session in different modes, the system can also modify the modes to align them in the session. Instant messages can be converted to speech and spoken in the teleconference from Max Power and speech can also be converted to text and transmitted to Max Power 204 for effective communication across modes.

The graphical elements can also convey information about the communication session by changing type, size, color, border, brightness, position, and so forth. The lines, for example, can convey relationships between participants. A user can manually trigger the changes for his or her own icon or others' icons, or the system 100 can detect change events and change the graphical elements accordingly. Change events can be based on a contacted party, context, persona, and/or presence. For example, as one person is talking, the system 100 can enlarge the icon representing that person. As another example, the system 100 can track how much each person in the communication session is talking and move graphical elements up and down based on a total talk time in the communication session.

In another variation, the system 100 modifies the links connecting the graphical elements 202, 204, 206 by changing their thickness, length, color, style, and/or animating the links. These modifications can represent a currently talking party, shared resources, an active communication session status, a held communication session status, a muted communication session status, a pending communication session status, a connecting communication session status, a multi-party line, a sidebar conversation, a monitored transfer, an unmonitored transfer, selective forwarding, and selective breakup of the communication session into multiple communication sessions, and so forth. In this manner, the user can obtain knowledge about the status of the session, the types of communications that are occurring, and other important details about the communication session.

In one aspect, a user provides input such as a gesture (such as drag and drop, tap and drag with a touch screen or performs any other instructive user input) to manipulate and manage the communication session. For example, the user can click a call icon 208, a video conference icon 210, an IM icon 212, an email icon 214, or a social media icon 216 to invite another user to join the communication session. A user can drag these icons and drop them on a contact or on a participant in a current communication session. For example, if an incoming communication session is in one modality (IM 212 for example), the user can drag the call icon 208 onto the incoming communication session to accept the incoming communication session but transcode it from IM to a call.

Some basic examples of how a user can interact with such icons are provided below. The disclosure will step through example uses of each utility icon 208, 210, 212, 214, 216 and 220. The first example will illustrate use of the calling icon 208. Assume the users Karl 206 and Frank 202 are shown as in FIG. 2C in a communication session but that it is via email and not a phone call. Frank 202 could desire to simply talk on the phone. In this case, Frank 202 could provide instructive input such as double tapping on the call icon 208 which would instruct the system to recognize a communication session exists but that a new mode of communication is requested for that session. A telephone call is then established between Frank 202 and Karl 206 and optionally graphically illustrated on the screen 200 with phone icons such as 202b.

An example of the use of the video icon 210 is presented next in the context of the initial display shown in FIG. 2A. Frank 202 taps and holds with one finger on the video icon 210 and simultaneously taps on the icon for Max Power 204 in the list of contacts 218. The system 100 recognizes the two inputs and interprets them as a request to initiate a video conference communication session with Max Power 204. The system 100 can retrieve presence information for Max Power 204 to determine if Max Power 204 can accept a video conference communication. Information 204a can indicate that Max has video conference capability and is currently available. If so, the system 100 establishes a communication session via video between Max 204 and Frank 202 and updates the display 200 accordingly. If not, the system 100 can ask Frank 202 if he desires to select another communication modality. Frank 202 can then tap on one or more available utility icons.

An example use of the IM icon 212 is presented next in the context of FIG. 2D. Frank 202 drags Karl 206, who is already a participant in an existing communication session, onto the IM icon 212 to establish an IM sidebar with that participant. The system 100 creates an additional communication session between Frank 202 and Karl 206 via IM that is separate from but concurrent with the main communication session 201. The system 100 can optionally show a representation of the IM sidebar between Frank 202 and Karl 206 to Max Power 204.

In an example use of the email icon 214 also in the context of FIG. 2D, Frank 202 can swipe three fingers over the email icon 214 on a touch screen to send a mass email to all or a portion of the participants in current communication sessions. The system 100 can identify all participants represented in the display 200 and retrieve available email addresses for those participants. If some participants do not have an available email address, the system 100 can intelligently select a suitable replacement, such as IM or SMS based on availability in general or current presence information or a current mode. After or while the system 100 is gathering all the email address information, Frank 202 can enter a message in a popup window and click send. The system 100 then sends the message to the intended recipients.

The social networking icon 216 is discussed in the context of FIG. 2D. Frank 202 double taps on the social networking icon 216. In one variation, the system 100 visually identifies which participants are not part of Frank's social network. Frank 202 can then click or tap on the visually identified participants to quickly add them to a social network such as LinkedIn or Facebook. In another variation, when Frank 202 taps once on a social networking icon 216 and once elsewhere, the system 100 can post on a social network data related to the location of the second tap, such as an audio clip, a document, a video file, a link, text, an image, or any other data. Social media include web sites such as Facebook, Twitter, LinkedIn, MySpace, and so forth.

The user can interact with the trash icon 220 by flicking participant icons in the general direction of the trash icon 220, drawing an X over a participant icon or over an entire communication session, shaking the device if the device is mobile or via other instructive input. The system 100 can terminate a communication session, delete a contact, remove a participant from a communication session, or take other actions based on the user interaction associated with the trash icon 220. Of course the trash icon 220 can take any other graphical image which reflects that a person or entity is leaving a communication session, such as door or a window. For example, a window or door can be on the display screen and the host can remove an entity from a communication session by moving the respective icon to the window or door. As can be appreciated, user interaction with a utility icon and at least one entity in a communication session can take many forms as discussed above. Each example interaction can be applied to other utility icons in a similar manner.

A user can also initiate a communication session by dragging and dropping an appropriate icon onto a contact. Alternatively, the user can browse through a list of contacts 218, then drag and drop a desired contact to add the desired contact to the communication session. The system 100 then automatically contacts that person in their desired mode, a sender preferred mode, a currently available mode based on presence information, or in a common available mode between the participants and joins that person to the communication session. The system 100 can display other information as well, such as a calendar, notes, memos, personal presence information, and time. A user can manually and seamlessly switch over from one modality to another mid-session. For example, a user participating in a communication session via cell phone who is now near a webcam can drag a video conferencing icon onto the communication session to switch from cell phone to video conferencing. The system 100 display can be user-configurable.

While drag and drop is used primarily in these examples, any user input can be provided such as tapping, flicking with a gesture, etc. to indicate a linking of a selected utility icon 208, 210, 212, 214, 216 with one or more participants (which may include people and non-person entities like a conference call or a calendar item).

In one aspect, user preferences guide the amount and type of information conveyed by the graphical elements and the associated text. User preferences can be drawn from a viewer's preferences and/or a source person's preferences. For example, a viewer sets preferences to show others' email addresses when available, but a source person sets preferences as never share email address. The source person's preferences (or preferences of the "owner" of the information) can override a third party's preferences.

Figure 3:
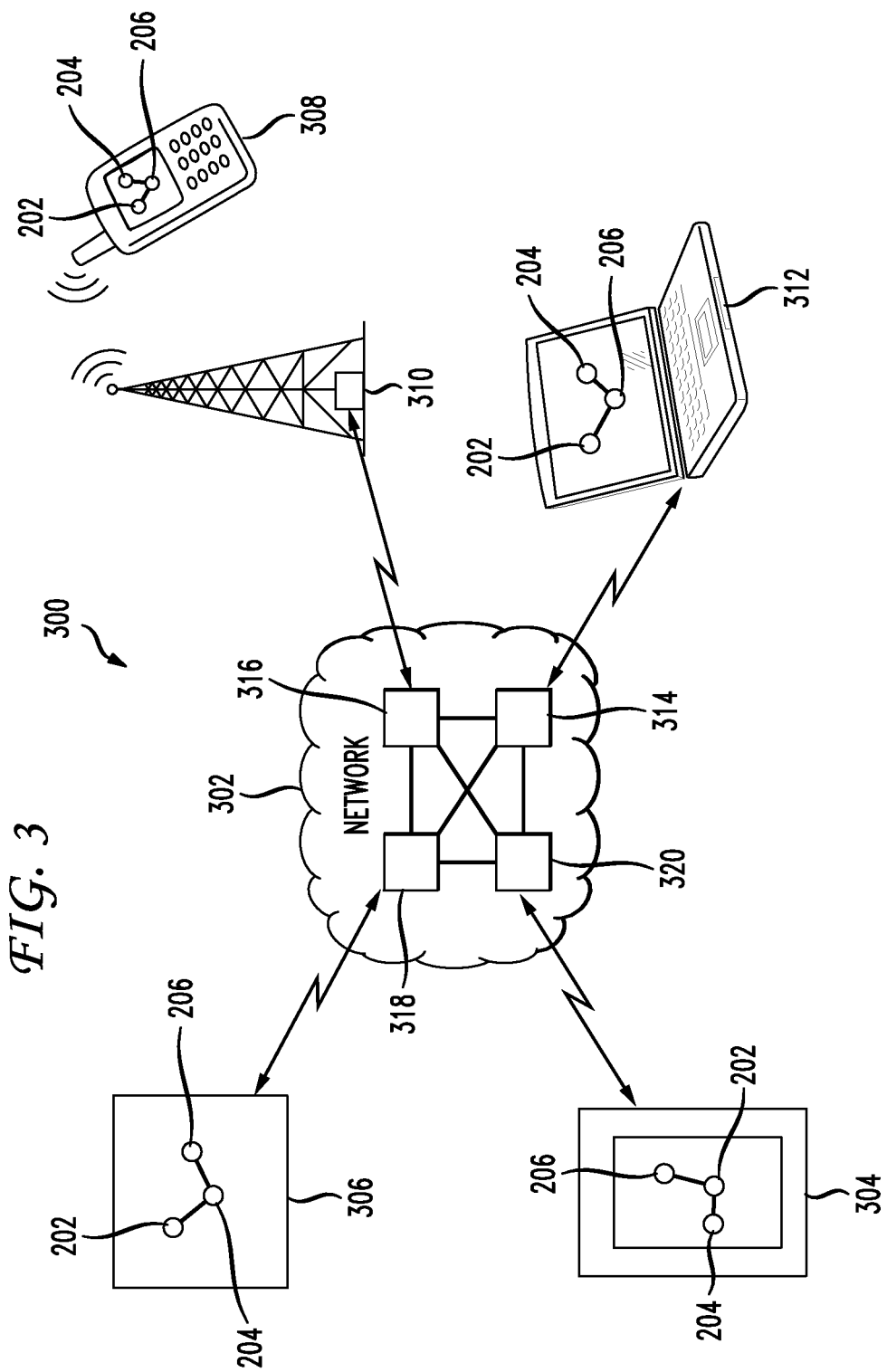
FIG. 3 illustrates a network view of the communication session.

Having discussed several variations of FIGS. 2A-2D, the discussion now turns to a network view 300 of the communication session as shown in FIG. 3. A network 302 connects various communications devices 304, 306, 308, 310, 312 and conveys information from device to device. The telecommunications network can be one of or a combination of a plain old telephone service (POTS) network, an asynchronous transfer mode (ATM) network, the world wide web, an integrated services digital network (ISDN), frame relay network, Ethernet network, token ring network, and any other suitable wired or wireless network. The network can include one or more interconnected nodes 314, 316, 318, 320 which perform all or part of the connection and transmission functionality that underlies the graphical representation of communication sessions on a GUI. Such network nodes 314, 316, 318, 320 can perform all the functionality in the network 302 or can operate in conjunction with end-user communication devices 304, 306, 308, 312 to manipulate communication sessions. Only the display component is shown for devices 304 and 306.

In one aspect, a centralized entity such as node 320 controls the communication session. The centralized entity 320 can reside in the network and/or communicate via the network. The centralized entity 320 can operate as a centralized enterprise intelligence server. In another aspect, the communication session control and functionality is distributed among multiple server resources 314, 316, 318, 320 in the network or cloud 302. In addition to a centralized intelligence and distributed intelligence in the cloud, the network 302 can provide this functionality using a peer-to-peer approach with intelligence on the endpoints 312, 308, 306, 304. Some variations include providing standardized functionality on a standards-compliant server and non-standardized functionality distributed across the endpoints. In some respects, the "system", "device", "communication device" or other characterization of a hardware component that performs certain steps can be interpreted as one or more of the various devices as endpoints or network elements shown in FIGS. 1 and 3.

Each communications device 306, 304, 312, 308 of FIG. 3 shows a different aspect or view of the same communication session. For example, the display of device 304 shows the same display of the same participants 202, 204, 206 as shown in FIG. 2D. The display of device 306 shows the same participants 202, 204, 206 in a different view of the communication session from the perspective of device 306. Likewise devices 308 and 312 show the same participants 202, 204, 206 in different views which can each be tailored to the individual participants in the communication session. Device 304 can represent a host or manager of the communication session but someone who is not shown as participating in the call.

In one aspect, a mobile device 308 connects with a base station 310 to connect to the network. A mobile device 308 can generate its own view of the communication session or it can generate a duplicate or a companion view of another device's display.

In general, the management of the communication session involves a user, such as the user interfacing with device 304, providing input to the graphical interface. The input as is noted herein involves an action step for manipulating or managing the communication session. Corresponding instructions are provided to the network node 320 or network nodes which actively provide the communication links to the various participants. Thus, the network node or nodes will carry out the instructions received from the managing device such that actions like communication session bridging, removing a person from the session, establishing a sidebar discussion, separating the communication session into several smaller communication sessions, and so forth, are appropriately carried out.

FIG. 3 also can illustrate a view of a person or entity who seeks to contact someone in a communication session. For example, assume Mary has device 304 and wants to call Frank 202. If she does, if permissions are granted, she can be presented with a visual of Frank's communication session showing 202, 204, 206. This can provide her varying levels of detail with respect to the type of communication, who is on the call, the subject matter of the call, etc. In this manner, Mary can be presented with options since she now has this knowledge. Perhaps she may want to IM or email instead of call. She may request to join the conference call. She me want to send a message to Frank 202 that she noticed he was on a call and could he return her call in 1 hour. Presenting Mary with a graphical image of the communication session presence of the person she is calling enables a more efficient mechanism for her to determine how to best take the next step in communicating with Frank 202.

Figure 4:
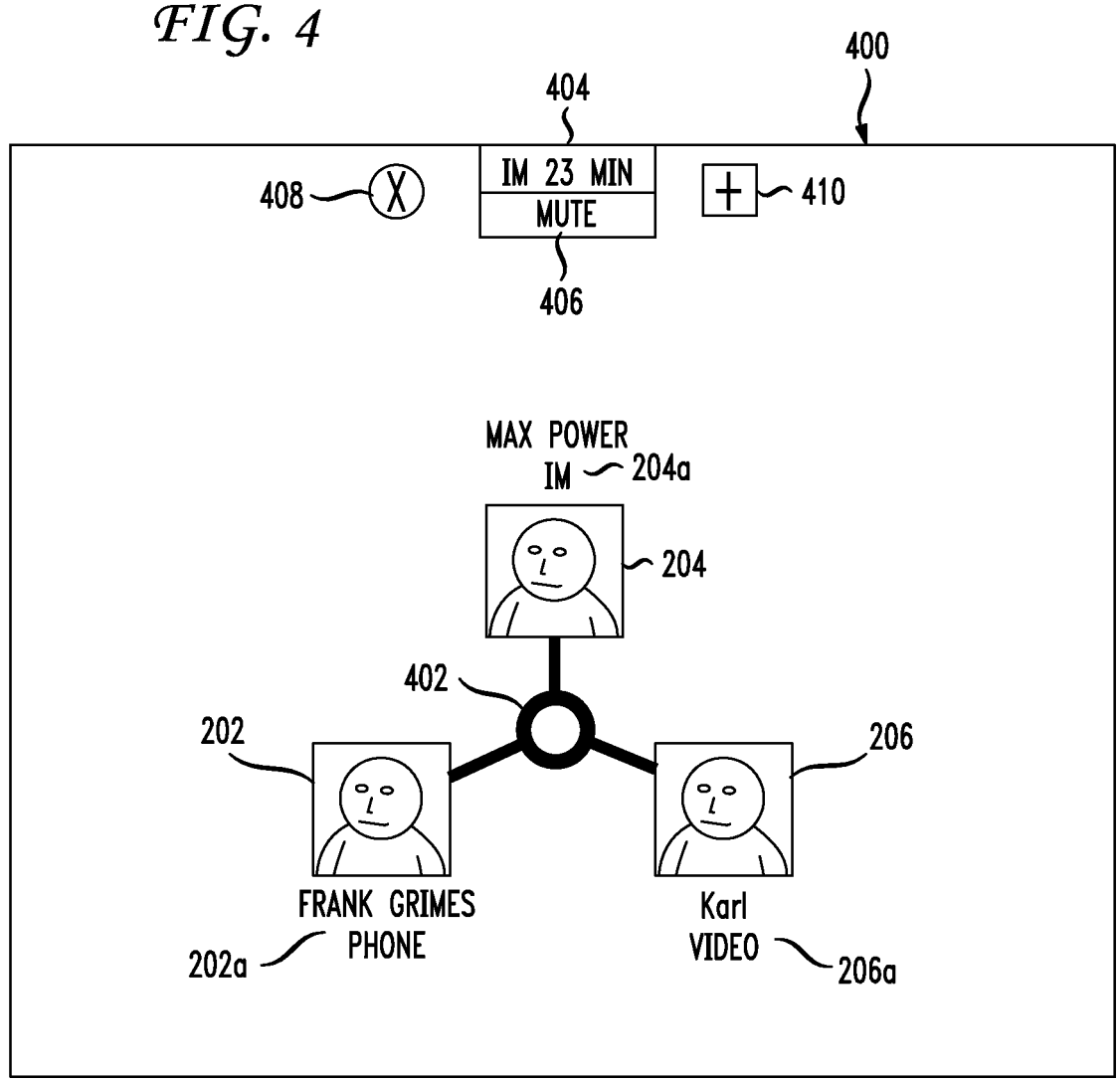
FIG. 4 illustrates a second view of the communication session.

FIG. 4 illustrates a different view 400 of the same communication session shown in FIG. 2D, but from the perspective of Max Power 204. In this case, Max Power is the moderator, so Max's icon 204 appears at a central location compared to the remaining participants' icons 202, 206. Each participant's icon has associated text 202a, 204a, 206a indicating name and communication mode. The text 202a, 204a, 206a can also represent other data about each person or can include icons indicating various types of data such as communication mode, presence, temporal information, calendar information, hierarchical information, employer information and so forth. The system 100 can arrange the icons based on an organizational hierarchy, role, location, seniority or other combinations of parameters.

The interface 400 in FIG. 4 uses connecting lines and a central hub 402 and spokes from the participants to the hub to indicate that the three participants 202, 204, 206 are in the communication session. As the system 100 engages in additional communication sessions, the display shows additional concurrent sessions in different locations. In some cases such as instant messaging, a single location contains multiple communication sessions of a same type. For example, multiple IM communication sessions can be displayed as a stack of cards at a single location. The hub 402 of FIG. 4 and the lines connecting icons in FIG. 2D are also illustrative display configurations for active connections. Other configurations of icons, text, and/or graphical elements can replace those shown herein.

The display 400 can include a title bar 404 and various controls such as a mute button 406, an exit button 408, a transcription button, and an "add participant" button 410. When a user clicks on the "add participant" button 410, the system 100 can present the user with a dialog to select one or more participants to add. The title bar 404 can include information such as call duration, call moderator, and preferred communication mode. When a user clicks on the mute button 406, the system 100 can mute the user's line or other participants' lines. For a participant, clicking the exit button 408 causes that participant to leave the conference. The moderator could also highlight one of the participants with a click or gesture and then click on exit 408 to remove them from the conference. The conference moderator can also terminate the communication session for all participants by clicking the exit button 408.

When a user clicks on a transcription button (not shown), the system 100 can engage a speech recognition module to recognize and transcribe speech. The system 100 can display transcriptions in real time, such as a ticker of text beneath a user's icon. The system 100 can also prepare a full transcript of an entire communication session and email the full transcript to selected participants after the communication session ends. The system 100 can transcode audio from a telephone call to text for a text messaging session via automatic speech recognition (ASR) and can convert in the other way via text-to-speech (TTS). Thus, Max 204 can communicate via IM with Frank 202 and Karl 206 in the same session but in different modes. These differences can be visually representing in the session display.

Alternatively, the user can browse and select a participant from a list of contacts and drag desired participants directly into the graphical representation of the conference. A user can also add a party to the communication session, invite a party to the communication session, drop a party from the communication session, split a communication session, form a sidebar communication session, and merge two communication sessions. A sidebar communication session is a concurrent session between two or more participants in a main communication session, but separate from the main communication session. For example, if Max Power 204 is proposing an idea, Frank Grimes 202 and Karl 206 can form a sidebar to discuss the proposed idea without Max Power listening or even knowing about the sidebar. In some cases knowledge of the sidebar's existence is available to other participants, but the other participants do not know what is being communicated in the sidebar.

Figure 5:
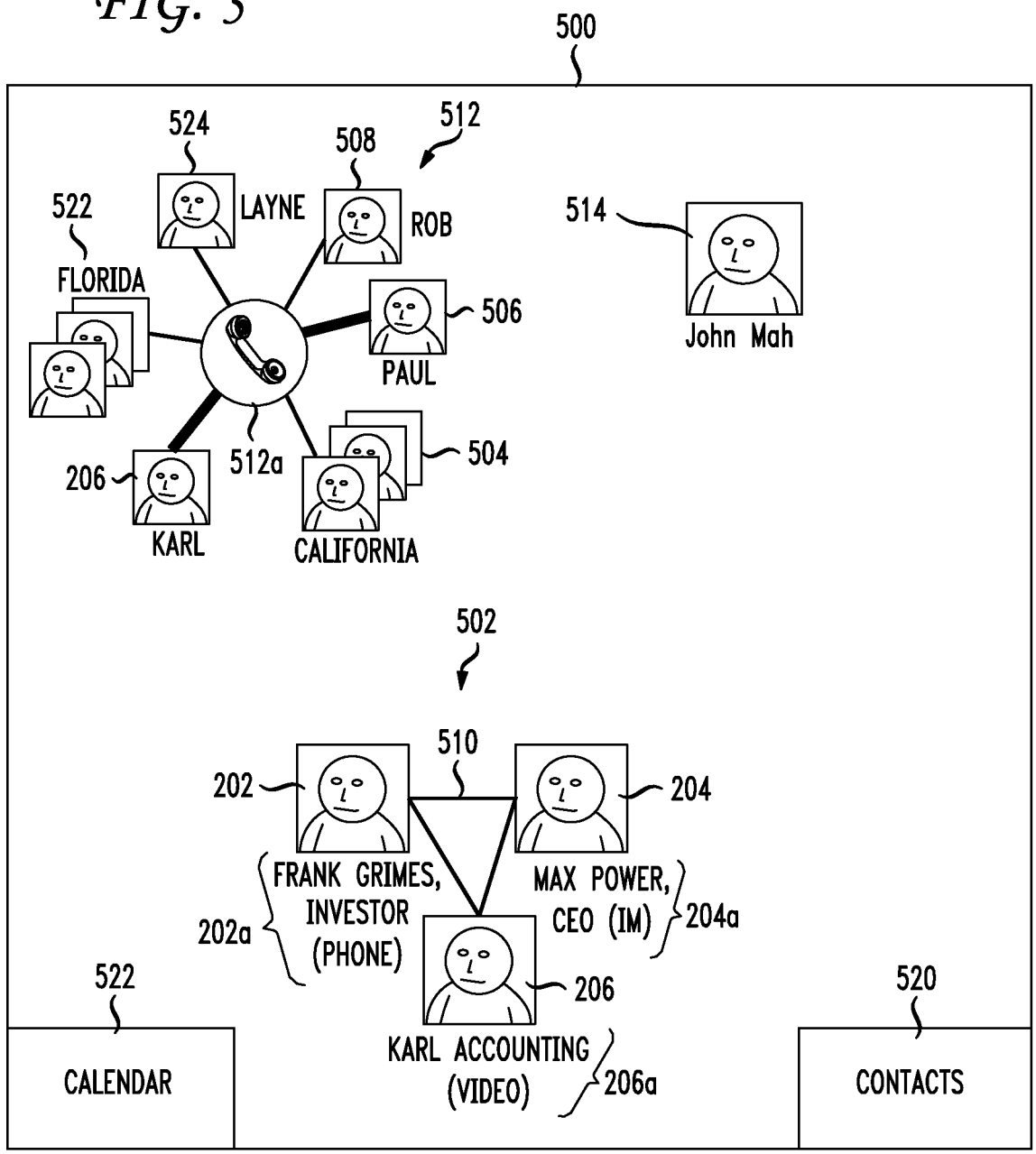
FIG. 5 illustrates a third view of the communication session with other concurrent communication sessions.

Having discussed several variations of FIG. 4, the discussion now turns to FIG. 5, which illustrates a third view 500 of a communication session 502 between Max Power 204, Frank Grimes 202, and Karl 206, but from the perspective of Karl 206 and with another concurrent real-time communication session 512 and a current incoming call 514 for Karl 206. The active connections of the communication session 502 are shown here connected via a triangle 510. The system 100 as shown in FIG. 5 can display overlapping graphical elements, a line connecting graphical elements, a shape connecting graphical elements, a shape with radiating lines connecting graphical elements, and/or a common augmented appearance of graphical elements. The system can group close together or overlap icons corresponding to individuals at a same location. Thus, the visual representation can vary for each "participant" in a communication session depending on the individual, location, grouping of people, and so forth. This visual image gives the participants and easy understanding of who is in the communication and the ability to easily manage the session graphically.

The display in FIG. 5 shows three separate concurrent communication sessions 502, 512, 514. The first communication session 502 is between Max 204, Frank 202 and Karl 206. Respective metadata is shown 202a, 204a, 206a. The second communication session 512 is a communication session in which Karl is a participant and which includes a group from California 504, Paul 506, Rob 508, Layne 524, and a group from Florida 522. Thus, Karl 206 is a simultaneous participant in two communication sessions. The system 100 displays each communication session separately. In addition to these two communication sessions, the system 100 displays an incoming communication 514 from John Mah. The incoming communication icon 514 can blink, bounce, pulse, grow, shrink, vibrate, change color, send an audible alert (such as a ringtone), and/or provide some other notification to the user of the incoming call. Karl 206 can interact with and manipulate this incoming request in the same manner as the other current communication sessions. The system 100 does not differentiate between an active communication session and a communication session representing an incoming call. For example, Karl 206 can drag and drop the incoming call 514 on top of the communication session 512 to add the incoming call directly to the communication session 512 or 502. As another example, Karl 206 can drag and drop the incoming communication 514 to a trash can icon to ignore the call, double click on the incoming communication 514 to send the incoming caller (if it is a call) to voicemail, or tap and hold to place the caller on hold.

If Karl 206 accepts the incoming communication 514 from John Mah, the system 100 creates and displays a new communication session including Karl 206 and John Mah (not shown in FIG. 5). The system 100 can place the new communication session elsewhere on the display.

The system 100 can visually represent active connections as overlapping graphical elements for individuals at one location. For example, in the second communication session 512, the participants from Florida are overlapped as are the participants from California. The user can manipulate these overlapping icons to identify or communicate with participants in a communications session.

The display can include a listing of contacts 520 and calendar events 522. User interactions with the contacts can trigger an expanding view or a popup window with more information. The user can then click on a particular contact to see a list of available modes of communication for that contact. The system 100 initiates an additional communication session with that contact based on a user selection of an available mode of communication. The system 100 connects and displays that communication session along with the existing three 502, 512 and the newly added session with John Mah (not shown).

Further, the system 100 can include a search capability. A user can search for contacts, calendar events, email addresses, phone numbers, and so forth. This approach can be advantageous for users with very large contact lists or for finding all members of a particular department.

Often a contact will include several contacts for a particular communication modality. For example, one contact can include four phone numbers, two text message numbers, three email addresses, and so on. In these cases the system 100 can intelligently select one of the available addresses or numbers for a selected modality, or the system 100 can present a disambiguation dialog so the user can select a desired address or number.

In many instances, a user will not have a contact entry for all the other communication session participants. To add a communication session participant as a contact, the user can drag and drop the desired icon on the contacts icon. The system 100 can automatically locate available information about that participant to add to the contact database.

One possible user input is to divide the communication session shown in FIGS. 6A-2B. The user can draw a line with a mouse drag or a finger on a touch screen separating the communication session into two groups. The system 100 can then divide the communication session into two separate concurrent communication sessions based on the groups. In one aspect, a communication session manager can divide a communication session for a limited time, after which the communication sessions are automatically merged together.

For example, a manager can say "Team A, discuss pros and cons of strategy A. Team B, discuss pros and cons of strategy B. After five minutes, we'll return and report on our discussions." Then the manager draws a line or otherwise selects groups for the breakout sessions and sets a duration. A dialog or icons can appear when the communication session is separated which present the available options for managing the separation. The system 100 divides the communication session and rejoins them after the set duration. The manager can indicate additional settings, such as prohibiting sidebar conversations between the groups during the breakout sessions. The manager can be independent of the breakout sessions and monitor each breakout session via audio, summary, and/or real-time text.

Figure 6:
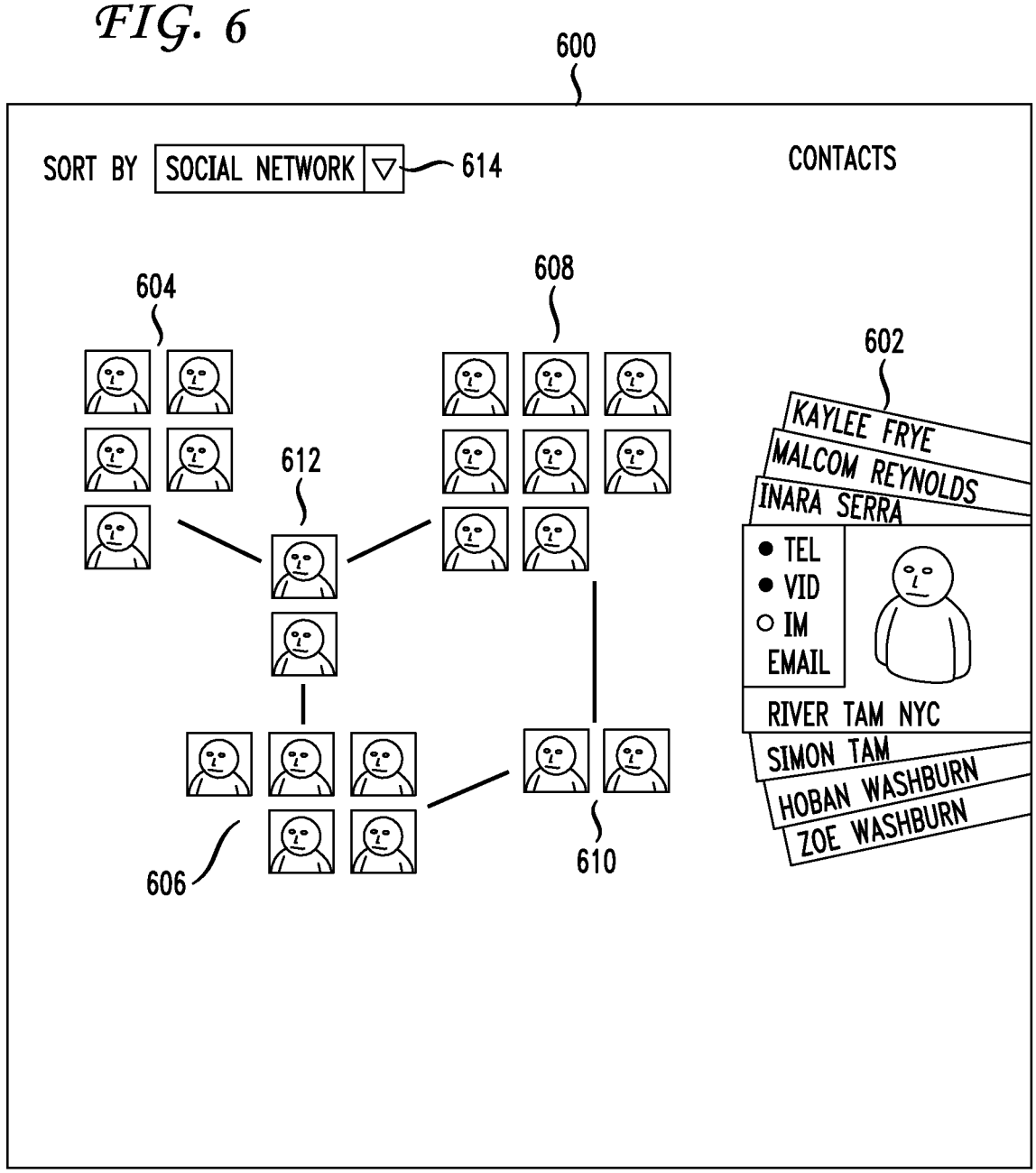
FIG. 6 illustrates an example display of contacts sorted by context.

FIG. 6 illustrates an example display 600 of contacts 602 sorted by context. The display 600 can include graphical representations of a communication session as shown in FIGS. 3-5 in addition to the displayed contacts. In this exemplary interface, a graphical presentation of contacts 602 provides a scrollable list of contacts. A user can scroll the list of contacts up or down, search the list, or filter by an alphanumeric index. The contact icons can be sorted by one or more factors and displayed as part of the contact manager on the screen rather than as an application on a separate device.

FIG. 6 can also represent a graphical representation of a user's contacts sorted by known social network relationships 614. For example, a first group 604 of contacts is associated with the user through LinkedIn. A second group 606 of contacts is associated with the user through Twitter. A third group 608 of contacts is associated with the user through Facebook. Some sub-groups of contacts are associated with the user in more than one way. Thus, a first sub-group 610 of contacts is associated with the user through Twitter and Facebook. A second sub-group 612 of contacts is associated with the user through LinkedIn, Twitter, and Facebook. These social networks can be explicit social media web sites such as those disclosed above like LinkedIn, Twitter, and FaceBook or they can implicit groupings such as organizations, projects and the like delineated in company directory or project listings. The user can manipulate, collapse, and hide groups and sub-groups in this view.

The set of contacts can also be generated based on frequently called individuals, individuals called based on the time of day, based on scheduled calendar events, or their relationship to the user.

In one aspect, a user can drag a group of contacts, such as the third group 608 of contacts, to a side of the display. The system 100 can then show that group of contacts as an element, similar to contact element 602. The system 100 can include multiple contact elements for various purposes. A particular arrangement of contact elements can be associated with a task or set of tasks, which the system 100 retrieves based on what the user is doing or based on the user's schedule. The system 100 can modify a listing of contacts by merging two groups of contacts, adding to or deleting from a group to generate a supergroup or a subgroup. The user can save certain combinations of contacts as a contacts template for future use. The user can save not only a combination of certain contacts, but a template of steps and/or sources to generate a combination of contacts.

Figure 7A:
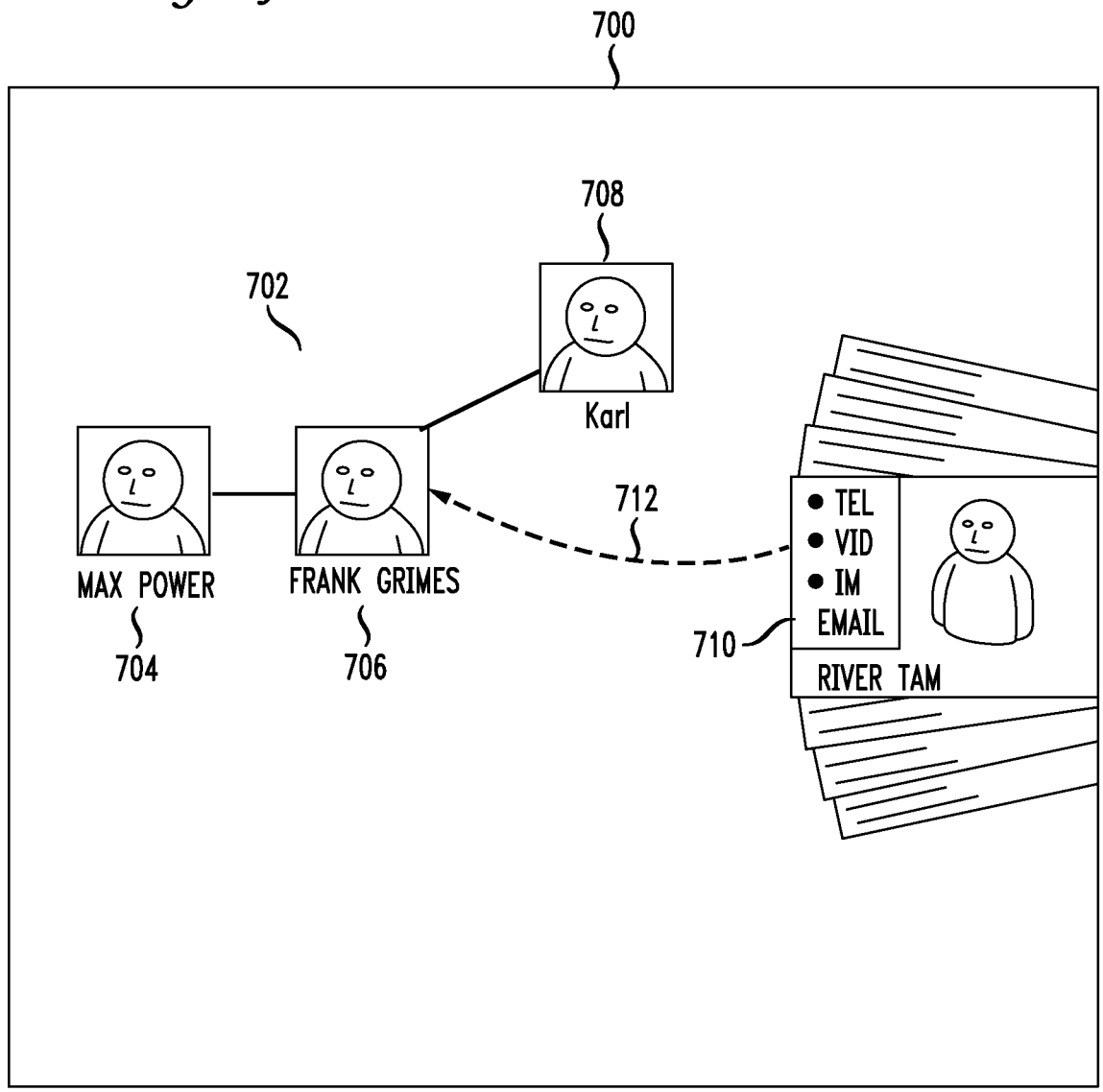
FIG. 7A illustrates an example insertion action for inserting a contact into an existing communication session.
Figure 7B:
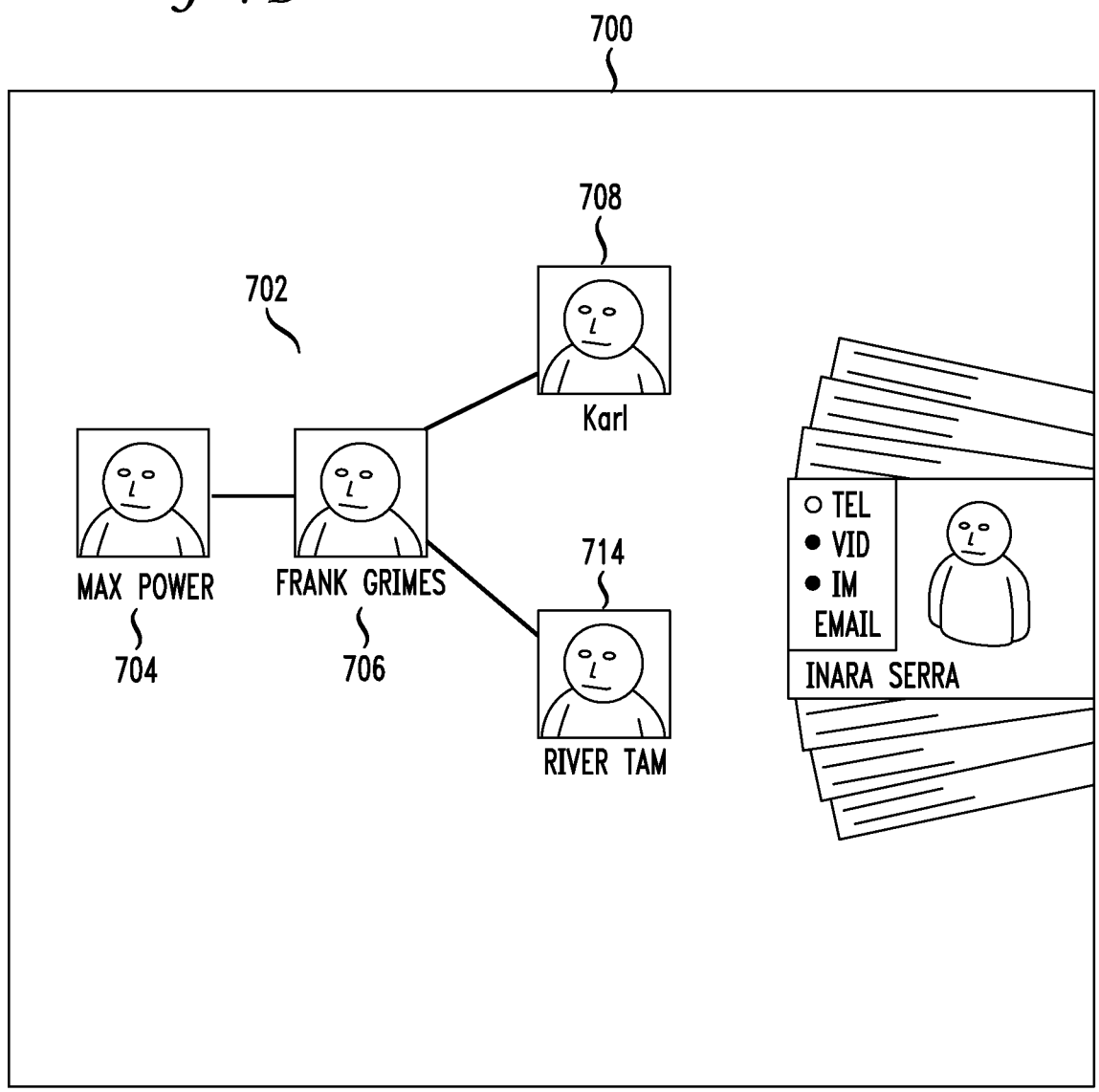
FIG. 7B illustrates the communication session after inserting the contact.

FIG. 7A illustrates an example insertion action for inserting a contact into an existing communication session. The system display 700 shows a graphical representation of a communication session 702 including Max Power 704, Frank Grimes 706, and Karl 708. The system display 700 also shows a set of contacts 710 sorted by context. The user drags 712 one of the contacts (River Tam) 710 and drops the contact onto the communication session 702. In this case, the user action indicates that the system 100 should insert River Tam 710 into the communication session. FIG. 7B illustrates the display 700 of the communication session 702 after inserting River Tam 714. The system shows a connected graph of graphical elements for Max Power 704, Frank Grimes 706, Karl 708, and River Tam 714. In this example, River Tam 714 is optionally removed from the contact element 710.

With reference to U.S. patent application Ser. No. 12/749,103, filed Mar. 29, 2010, certain communication sessions are virtual meeting rooms. The system 100 treats such virtual meeting rooms like other communication sessions with the exception that some virtual meeting rooms can persist even after all human participants leave the virtual meeting room. In the framework of context-based contacts, one example context is a group of people that participated in a communication session, such as a persistent virtual meeting room, at a previous time and are maintained as a group as part of a persistent nature of that communication session. In this respect, the user could select from a contact list that is organized based on context, a participant or participants grouped based on previous participation in a communication session and reactivate that communication session.

Additionally, a user could also access a persistent communication session through a list such as a contact list or robot list.

Figure 8:
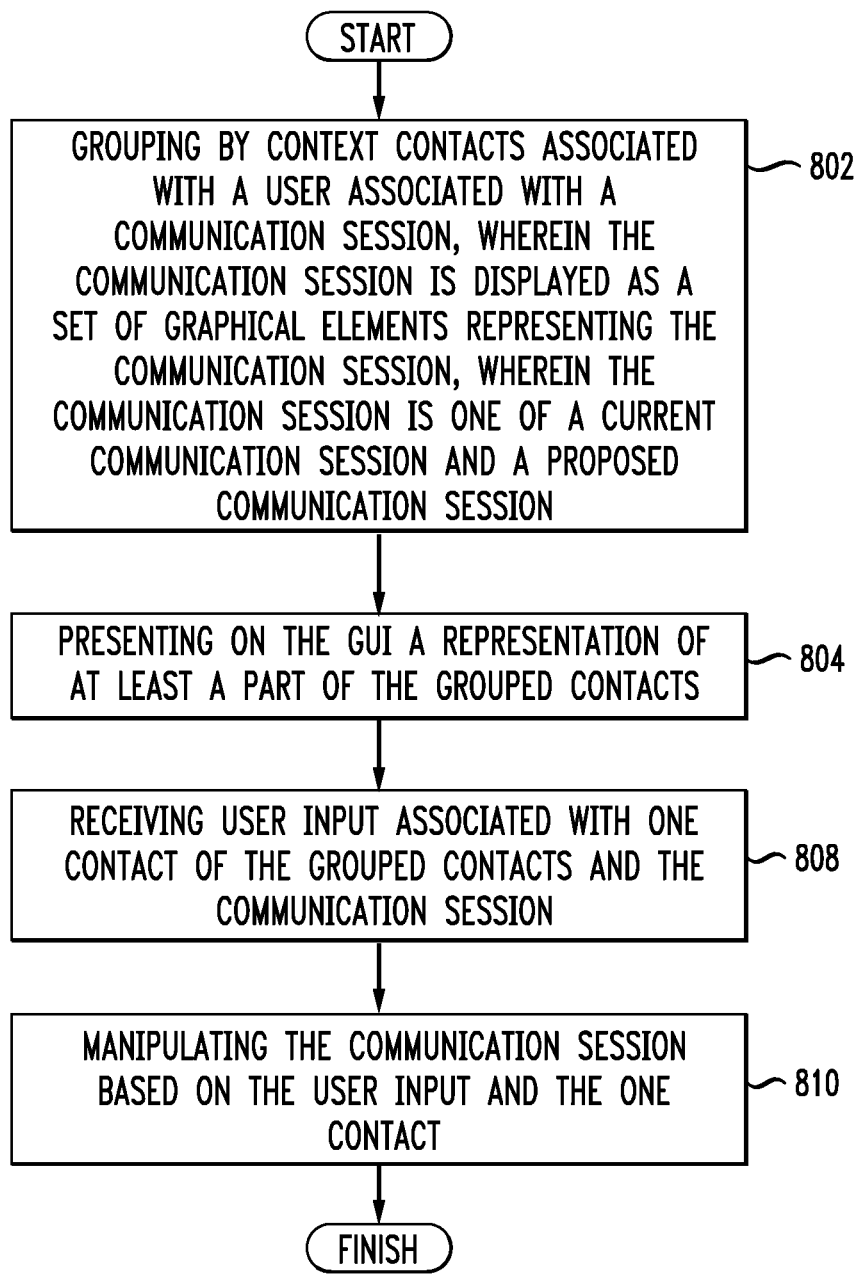
FIG. 8 illustrates an example method embodiment.

The disclosure now turns to the exemplary method embodiment shown in FIG. 8. For the sake of clarity, the method is discussed in terms of an exemplary system such as is shown in FIG. 1 and/or a network node as shown in FIG. 3 configured to practice the method.

FIG. 8 illustrates an exemplary method embodiment for presenting a contact manager associated with a communication session represented in a graphical user interface (GUI). The communication session can be a communication session such as a telephone call between two users or a communication session between three or more users. The communication session can be mode-neutral so that users in the session can communicate using any of a number of communication modes such as telephone, cellular phone, voice over IP (VoIP), video conference, text message, instant messaging, web-based chat, email, and so forth. The communication session can also be multi-media/modal and combine two or more of the modes listed above. The GUI allows users to manipulate the communication session quickly and intuitively. Devices having different capabilities can present respective users with a suitable GUI tailored to those capabilities. For example, a desk phone may have a more powerful processor and graphics abilities, larger screen, more memory, higher bandwidth, and so forth than a mobile device. Such a desk phone can display the GUI with full interaction and animation, whereas the mobile communication device may only provide a subset of that full functionality suited to its own capabilities.

The graphical elements can include images, caricatures, avatars, text, and a hyperlink to additional information related to a user associated with the graphical elements. The text can include a name, a title, a position, a telephone number, email address, a current status, presence information, and location. The system can change or animate the graphical elements based on a contacted party context, persona, and presence. Active connections to the communication session can be visually represented as a graphical connection metaphor having overlapping graphical elements, a line connecting graphical elements, a shape connecting graphical elements, a shape with radiating lines connecting graphical elements, and/or a common augmented appearance of graphical elements. Overlapping graphical elements can represent individuals at one location. Further, changing color, thickness, animation, texture, and/or length of graphical elements can indicate a relationship or status of entities represented by the graphical elements.

The system 100 groups by context contacts associated with a user associated with a communication session, wherein the communication session is displayed as a set of graphical elements representing the communication session, wherein the communication session is one of a current communication session and a proposed communication session (802). Grouping by context can be based on many factors such as user preferences, user communications history, user calendar, social networks, topic, project, and employer or any other criteria. The presentation of these contacts can be sorted by one or more of these factors and displayed as part of the contact manager. The system 100 can group contacts based on one or more context tags. The system 100 can also sort the set of contacts as a cache, such as a cache of recent contacts.

The system 100 presents on the GUI a representation of at least a part of the grouped contacts (804). The system 100 can present icons of the grouped set of contacts alone or in combination with other grouped sets. The icons for a grouped set can be connected with lines, grouped in close proximity, overlapped, arranged in a shape, and/or presented in any other suitable graphical metaphor indicating their relatedness. The system 100 can intelligently identify a subset of the set of contacts for display if the set of contacts contains too many to display on the available screen space. In another variation, the system 100 presents all the icons in a group, but enlarges icons of contacts of higher significance and shrinks icons of lower significance.

The system 100 receives user input associated with one contact of the grouped contacts and the communication session (806). For example, the user can click and drag, drag and drop, touch and slide, double-tap and flick, or otherwise move a contact's icon to a communication session. The user can click on a contact's icon and click on the communication session. The user can say "add John Roberts to the chat session", which the system 100 can recognize using automatic speech recognition. User input can also take the form of keyboard input, mouse input, touch screen single-touch or multi-touch gestures, stylus input, and so forth. In one aspect, the user holds the control button on the keyboard and clicks to select multiple contacts. The system 100 can then apply the indicated action to the selected contacts.

Further, the user can provide input to manage the grouped contacts which is not associated with the communication session. For example, the user can indicate that a particular contact does not belong in the grouping. In response to such input, the system 100 can remove that contact and request additional user input indicating to which group the contact should belong, or the system 100 can create several variations as described above.

The system 100 manipulates the communication session based on the user input and the one contact (808). The system 100 can add contacts to the communication session, create a sidebar communication session with a contact, split the communication session based on a selected contact, share contact information with communication session participants, invite the contact to join the communication session, and so forth. FIGS. 7A and 7B below show one example of how to add or invite a contact to a communication session. Sidebar communications are a form of private communication concurrent to but separate from a main communication session. One example of a sidebar communication is an instant messaging conversation between two or more participants in a communication session. In one example where the selected contact is a supervisor, the system 100 can split the communication session into two groups of participants based on which participants report to the supervisor and which ones do not. If a user drags a contact's icon into a communication session, the system 100 can share that contact's information (such as email, phone number, name, title, picture, bio, and so forth) with other communication session participants directly or via a social media outlet. All or part of this method can incorporate social media information from sources such as Facebook and LinkedIn.

The system 100 can present a user with a contextual menu asking which action to take based on the user input. The contextual menu can further clarify or disambiguate a user input. For example, if the user drags and drops an IM icon on a contact, the system 100 may request clarification of what that input means. The contextual menu can ask if the user meant to start a new communication session via IM, create a sidebar communication session via IM, change a current communication session to IM, and so forth. The contextual menu can pop up when the user drops an icon on the session, after a user holds down a mouse button for 2 seconds, or at some other suitable time. In some cases, the type of user input can clearly indicate which action to take without the need for a contextual menu or other disambiguation steps. For example, if a user drags an icon onto the communication session, the contact associated with that icon is added to the session. If the user holds shift and drags the icon, the contact is invited to the session. If a user uses a three-finger multi-touch gesture to move the icon to the communication session, the system display a "card" of information about the contact associated with that icon to communication session participants.

The presented group of contacts based on context can also dynamically change as the communication session changes. For example, if the context of a session is based on business associates of the host and the three parties on the session, and one of the parties drops off the session, then the context will naturally change since the dropped person's business associates may no longer provide a context for the session. The remaining members may not have as much of a likely desire to add one of those business associates to the session. Therefore, the presented group of contacts may dynamically be reduced to eliminate those contacts that were previously grouped because of the participation of the dropped person in the session. In a similar manner, depending on the parameter defining the context, the group of contacts can dynamically change long with the changing configuration of the communication session.

Another embodiment disclosed herein relates to a method of generating and presenting a group of contacts available for selection and user input to modify a communication session that is graphically displayed with the group of contacts. FIG. 9 illustrates a method of receiving data about a group of contacts (902), sorting the group of contacts based on the received data and relative to a current communication session including a user (904), displaying at least one contact of the sorted group of contacts to the user with a graphical display of each participant in the communication session including the user (906), receiving user input associated with the communication session and a selected contact of the at least one contact (908), and modifying the communication session relative to the selected contact (910).

An example will illustrate the method set forth above. Assume that the group of contacts is the user's entire contact listing in Microsoft Outlook®. Assume the user has a current communication session as is shown in FIGS. 2A-2D with various users. The contact manager via the system 100 or network node 320 or combination thereof can then sort the group of contacts under any criteria such as topics, projects, employer, communication history, time-based parameters, participants to a communication session, etc. and display at least one contact along with the graphical representation of the communication session. Assume that the user desires to add one of the contacts to the communication session. The user can then drag and drop that user from the contacts list onto the communication session and the system automatically dials that user and connects them to the call. Alternately, when the contact is selected, the system can present options for phone numbers, IM numbers, email addresses, etc. to enable the user to select how to join that person in the communication session. Other options include arranging a sidebar or separate communication prior to joining them in the call.

The gathered data associated with the group of contacts can also be based at least in part on the communication session. For example, the user may initiate a communication session with two people (so that a total of three are on the call). The system 100 can automatically gather the data that identifies which two other people were previously on this project or on a call with the three current attendees of the call and include them in a context-based contact list. Several groups of contacts can be presented, with each group differentiated by its respective context. One group can be displayed based on a social network, one group can be displayed based on a work project, and so forth. As noted above, the context of the session may be dynamic and change with changes to the structure of the communication session. In this respect, the system can revise the context and thus the group of contacts to reflect a current context of the communication session. This will continually present to the user an optimized group of contacts that are likely to be selected by the user for inclusion in the communication session or a side communication based on that context.

Where multiple concurrent communication sessions are operational as is shown in FIG. 5, each session can have its own group of contacts that may be presented for easy selection in a graphical region near the respective session.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   during an active communication session among communication devices of a plurality of users, grouping, by a microprocessor using a first context, contacts associated with the plurality of users to yield a first grouping of contacts, wherein the first grouping of contacts are for adding one or more users to the active communication session, wherein the microprocessor displays the active communication session on a graphical user interface as a set of graphical elements representing the active communication session, and wherein the set of graphical elements comprises avatars, each avatar of the avatars representing a corresponding user of the plurality of users;
   presenting, by the microprocessor on the graphical user interface, a representation of the first grouping of contacts;
   receiving, by the microprocessor, user input associated with a contact from the first grouping of contacts, wherein the contact is not represented on the graphical user interface as participating in any active communication sessions prior to receiving the user input, and wherein the user input comprises detecting the user dragging a graphical element representing the contact from the representation of the first grouping of contacts and dropping the graphical element onto the set of graphical elements representing the active communication session;

joining, by the microprocessor, the contact into the active communication session; and in response to joining the contact into the active communication session:

revising the first context and generating a second grouping of contacts; and presenting, on the graphical user interface, a graphical representation of at least part of the second grouping of contacts;

removing one of the plurality of users from the active communication session;

in response to removing the one of the plurality of users from the active communication session, dynamically determining a second context based on a remaining number of participants; and in response to determining the second context based on the remaining number of participants, displaying a third grouping of contacts based on the second context wherein the third grouping of contacts are for adding one or more users to the active communication session.

2. The method of claim 1, wherein grouping the contacts comprises sorting the contacts based on one of: the active communication session, a user preference, a user communications history, a social network, a topic, a project, a family relationship, a friend relationship, a hobby, an area of interest, a political affiliation, a school, a calendar, a local time zone, or an employer.

3. The method of claim 1, further comprising establishing a sidebar communication session, while the active communication session remains active, including the contact.

4. The method of claim 1, wherein the set of graphical elements is based on presence information of the contacts, the presence information indicating whether each of the contacts is available to participate in the active communication session.

5. The method of claim 1, wherein the plurality of users are in the active communication session using a plurality of different communication modes, wherein the plurality of different communication modes comprise at least two of a telephone call, a multi-media communication session, a video conference session, and an Instant Messaging (IM) session and wherein the active communication session is agnostic to the plurality of different communication modes of the plurality of users.

6. The method of claim 1, wherein each avatar has a graphical sub-element indicating a preferred communication mode associated with the corresponding user.

7. The method of claim 1, where the first context is based on a calendar of one of the plurality of users.

8. The method of claim 1, wherein grouping by using the first context comprises:

receiving a group of contacts; and sorting the group of contacts relative to the active communication session.

9. The method of claim 8, further comprising:

identifying two or more contacts that were on a previous communication session using the first context; and sorting the group of contacts relative to the two or more contacts that were on the previous communication session using the first context.

10. The method of claim 1, wherein the active communication session is a social network communication session and wherein the first grouping of contacts are presented as a plurality of groups associated with a plurality of social networks with one or more sub-groups that shows one or more users that are common between the plurality of groups associated with the plurality of social networks.

11. A system comprising:

a processor; and a computer-readable storage device storing instructions which, when executed by the processor, cause the processor to perform operations comprising:

grouping, by context and during an active communication session among communication devices of a plurality of users, a set of contacts associated with the plurality of users to yield a first grouping of contacts, wherein the first grouping of contacts are for adding one or more users to the active communication session, wherein the processor displays the active communication session on a graphical user interface as a set of graphical elements representing the active communication session, and wherein the set of graphical elements comprises avatars, each avatar of the avatars representing a corresponding user of the plurality of users;

presenting, on the graphical user interface, a representation of the first grouping of contacts;

receiving user input associated with a contact from the first grouping of contacts, wherein the contact is not represented on the graphical user interface as participating in any active communication sessions prior to receiving the user input, and wherein the user input comprises the processor detecting the user dragging a graphical element representing the contact from the representation of the first grouping of contacts and dropping the graphical element onto the set of graphical elements representing the active communication session;

joining the contact into the active communication session;

in response to joining the contact into the active communication session;

revising the context and generating a second grouping of contacts; and presenting, on the graphical user interface, a graphical representation of at least a part of the second grouping of contacts;

removing one of the plurality of users from the active communication session;

in response to removing the one of the plurality of users from the active communication session, dynamically determining a second context based on a remaining number of participants; and in response to determining the second context based on the remaining number of participants, displaying a third grouping of contacts based on the second context wherein the third grouping of contacts are for adding one or more users to the active communication session.

12. The system of claim 11, wherein grouping the set of contacts comprises one of sorting the set of contacts as a cache, or grouping based on one of user preferences, user communications history, social networks, topic, project, family relationship, friend relationship, hobby, area of interest, political affiliation, current/future/former school, a calendar, a local time zone, or employer.

13. The system of claim 11, the computer-readable storage device storing additional instructions which, when executed by the processor, cause the processor to perform further operations comprising establishing a sidebar communication session, while the active communication session remains active, including the contact.

14. The system of claim 11, wherein the set of graphical elements is based on presence information of the contacts, the presence information indicating whether each of the contacts is available to participate in the active communication session.

15. The system of claim 11, wherein the active communication session is a social network communication session and wherein the first grouping of contacts are presented as a plurality of groups associated with a plurality of social networks with one or more sub-groups that shows one or more users that are common between the plurality of groups associated with the plurality of social networks.

16. A processor and a computer-readable storage device storing instructions which, when executed by the processor, cause the processor to perform operations comprising:
grouping, by context and during an active communication session among communication devices of a plurality of users, a set of contacts associated with the plurality of users to yield a first grouping of contacts, wherein the first grouping of contacts are for adding one or more users to the active communication session, wherein the active communication session is displayed on a graphical user interface as a set of graphical elements representing the active communication session, and wherein the set of graphical elements comprises avatars, each avatar of the avatars representing a corresponding user of the plurality of users;
presenting, on the graphical user interface, a representation of the first grouping of contacts;
receiving user input associated with a contact from the first grouping of contacts, wherein the contact is not represented on the graphical user interface as participating in any active communication sessions prior to receiving the user input, and wherein the user input comprises detecting the user dragging a graphical element representing the contact from the representation of the first grouping of contacts and dropping the graphical element onto the set of graphical elements representing the active communication session;
joining the contact into the active communication session; and
in response to joining the contact into the active communication session:
revising the context and generating a second grouping of contacts; and
presenting, on the graphical user interface, a graphical representation of at least part of the second grouping of contacts;
removing one of the plurality of users from the active communication session;
in response to removing the one of the plurality of users from the active communication session, dynamically determining a second context based on a remaining number of participants; and
in response to determining the second context based on the remaining number of participants, displaying a third grouping of contacts based on the second context wherein the third grouping of contacts are for adding one or more users to the active communication session.

17. The computer-readable storage device of claim 16, wherein grouping the set of contacts comprises one of:
sorting the set of contacts as a cache; or
grouping based on one of user preferences, user communications history, social networks, topic, project, family relationship, friend relationship, hobby, area of interest, political affiliation, current/future/former school, a calendar, a local time zone, or an employer.

18. The computer-readable storage device of claim 16, storing additional instructions which, when executed by the processor, cause the processor to perform further operations comprising establishing a sidebar communication session, while the active communication session remains active, between the user and the contact.

19. The computer-readable storage device of claim 16, wherein the active communication session is a social network communication session and wherein the first grouping of contacts are presented as a plurality of groups associated with a plurality of social networks with one or more sub-groups that shows one or more users that are common between the plurality of groups associated with the plurality of social networks.

* * * * *